United States Patent
Shao

(10) Patent No.: US 10,863,449 B2
(45) Date of Patent: Dec. 8, 2020

(54) UPLINK CHANNEL SENDING METHOD AND APPARATUS

(71) Applicant: Huawei Technologies Co., Ltd., Shenzhen (CN)

(72) Inventor: Jiafeng Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,595

(22) Filed: Feb. 11, 2019

(65) Prior Publication Data

US 2019/0174428 A1 Jun. 6, 2019

Related U.S. Application Data

(63) Continuation of application No. PCT/CN2016/094916, filed on Aug. 12, 2016.

(51) Int. Cl.
*H04W 52/50* (2009.01)
*H04W 52/28* (2009.01)
(Continued)

(52) U.S. Cl.
CPC .............. *H04W 52/281* (2013.01); *H04L 5/00* (2013.01); *H04L 5/0048* (2013.01);
(Continued)

(58) Field of Classification Search
CPC ............. H04W 52/281; H04W 52/146; H04W 52/346; H04W 52/50; H04W 72/042; H04L 5/00; H04L 5/0048
(Continued)

(56) References Cited

U.S. PATENT DOCUMENTS

| 7,423,976 | B2 * | 9/2008 | Wang | H03M 13/091 370/252 |
| 7,729,715 | B2 * | 6/2010 | Love | H04W 52/52 455/522 |

(Continued)

FOREIGN PATENT DOCUMENTS

| CN | 102497663 A | 6/2012 |
| CN | 102958147 A | 3/2013 |

(Continued)

OTHER PUBLICATIONS

"Discussion on UL RS for short TTI," 3GPP TSG RAN WG1 Meeting #85, Nanjing, China, R1-164063, 3rd Generation Partnership Project, Valbonne, France (May 23-27, 2016).

(Continued)

*Primary Examiner* — Hai V Nguyen
(74) *Attorney, Agent, or Firm* — Leydig, Voit & Mayer, Ltd.

(57) ABSTRACT

The present invention relates to the communications field, and provides an uplink data sending method and apparatus, so as to adapt to uplink channel sending in a case of a shortened transmission cycle. The method includes: performing, by a terminal, power control depending on whether a time domain resource on which an uplink channel is located carries a reference signal (RS) of the uplink channel; determining first transmission power of a first uplink channel; and sending, by the terminal, the first uplink channel at the first transmission power. The foregoing method improves accuracy of uplink channel demodulation by a base station.

12 Claims, 10 Drawing Sheets

(51) Int. Cl.
*H04W 52/14* (2009.01)
*H04L 5/00* (2006.01)
*H04W 52/34* (2009.01)
*H04W 72/04* (2009.01)

(52) U.S. Cl.
CPC ....... *H04W 52/146* (2013.01); *H04W 52/346* (2013.01); *H04W 52/50* (2013.01); *H04W 72/042* (2013.01)

(58) Field of Classification Search
USPC .................................................. 455/522, 69
See application file for complete search history.

(56) References Cited

U.S. PATENT DOCUMENTS

| | | | | |
|---|---|---|---|---|
| 8,521,207 | B2* | 8/2013 | Zhang | H04W 52/346 455/522 |
| 8,559,889 | B2* | 10/2013 | Malladi | H04W 52/10 455/69 |
| 8,611,442 | B2* | 12/2013 | Ratasuk | H04L 5/003 375/260 |
| 8,839,362 | B2* | 9/2014 | Jung | H04L 63/04 726/2 |
| 8,862,185 | B2* | 10/2014 | Callard | H04W 88/08 455/561 |
| 9,510,350 | B2* | 11/2016 | Baldemair | H04W 72/0446 |
| 9,565,061 | B2* | 2/2017 | Callard | H04W 88/08 |
| 9,749,970 | B2* | 8/2017 | Vajapeyam | H04W 52/365 |
| 9,763,199 | B2* | 9/2017 | Pelletier | H04W 52/365 |
| 9,807,709 | B2* | 10/2017 | Deng | H04W 52/383 |
| 9,894,558 | B2* | 2/2018 | Koskinen | H04W 28/02 |
| 9,906,345 | B2* | 2/2018 | Baldemair | H04L 5/0051 |
| 9,949,169 | B2* | 4/2018 | Yerramalli | H04L 5/005 |
| 10,015,751 | B2* | 7/2018 | Yi | H04W 52/247 |
| 10,069,613 | B2* | 9/2018 | Nory | H04L 5/0042 |
| 10,111,190 | B2* | 10/2018 | Pelletier | H04W 72/0446 |
| 10,182,407 | B2* | 1/2019 | Li | H04W 92/18 |
| 10,200,904 | B2* | 2/2019 | Zhang | H04L 41/08 |
| 10,206,208 | B2* | 2/2019 | Ye | H04W 74/008 |
| 10,219,225 | B2* | 2/2019 | Kim | H04W 88/06 |
| 10,271,288 | B2* | 4/2019 | Pelletier | H04W 52/367 |
| 10,313,980 | B2* | 6/2019 | Kim | H04W 52/14 |
| 10,367,620 | B2* | 7/2019 | Iyer | H04L 1/1893 |
| 10,390,335 | B2* | 8/2019 | Choi | H04L 1/0025 |
| 10,412,755 | B2* | 9/2019 | Yerramalli | H04W 72/1268 |
| 10,715,225 | B2* | 7/2020 | Hessler | H04B 17/104 |
| 2007/0155335 | A1* | 7/2007 | Love | H04W 52/52 455/69 |
| 2010/0040028 | A1* | 2/2010 | Maheshwari | H04W 72/1242 370/336 |
| 2010/0069083 | A1* | 3/2010 | Wei | H04W 72/085 455/452.2 |
| 2010/0246463 | A1* | 9/2010 | Papasakellariou | H04W 52/146 370/311 |
| 2011/0243262 | A1* | 10/2011 | Ratasuk | H04L 27/261 375/260 |
| 2012/0163252 | A1* | 6/2012 | Ahn | H04W 52/48 370/280 |
| 2013/0109430 | A1* | 5/2013 | Tseng | H04W 52/383 455/522 |
| 2013/0176953 | A1* | 7/2013 | Stern-Berkowitz | H04W 52/281 370/329 |
| 2013/0178221 | A1* | 7/2013 | Jung | H04W 52/281 455/450 |
| 2013/0203398 | A1* | 8/2013 | Callard | H04W 88/08 455/418 |
| 2013/0324182 | A1* | 12/2013 | Deng | H04W 52/242 455/522 |
| 2014/0050205 | A1* | 2/2014 | Ahn | H04B 17/318 370/336 |
| 2015/0024802 | A1* | 1/2015 | Callard | H04W 88/08 455/561 |
| 2015/0117384 | A1* | 4/2015 | Papasakellariou | H04L 27/18 370/329 |
| 2015/0282104 | A1* | 10/2015 | Damnjanovic | H04W 72/0446 455/522 |
| 2016/0029239 | A1* | 1/2016 | Sadeghi | H04B 17/345 370/252 |
| 2016/0174238 | A1* | 6/2016 | Chen | H04L 1/0045 370/336 |
| 2016/0205631 | A1* | 7/2016 | Chen | H04W 52/04 455/522 |
| 2016/0255594 | A1* | 9/2016 | Vajapeyam | H04W 52/365 455/522 |
| 2016/0345206 | A1* | 11/2016 | Yerramalli | H04L 5/005 |
| 2016/0381589 | A1* | 12/2016 | Zhang | H04W 24/10 370/252 |
| 2017/0013565 | A1* | 1/2017 | Pelletier | H04W 52/343 |
| 2017/0019886 | A1* | 1/2017 | Patel | H04W 76/14 |
| 2017/0041115 | A1* | 2/2017 | Baldemair | H04W 72/0446 |
| 2017/0215179 | A1* | 7/2017 | Choi | H04W 16/14 |
| 2017/0280476 | A1* | 9/2017 | Yerramalli | H04W 72/0453 |
| 2017/0303192 | A1* | 10/2017 | Sun | H04W 52/0206 |
| 2017/0311200 | A1* | 10/2017 | Koskinen | H04W 76/27 |
| 2017/0339676 | A1* | 11/2017 | Belghoul | H04W 72/1278 |
| 2017/0366311 | A1* | 12/2017 | Iyer | H04L 5/0007 |
| 2018/0014255 | A1* | 1/2018 | Pelletier | H04W 72/0473 |
| 2018/0014265 | A1* | 1/2018 | Deng | H04W 52/242 |
| 2018/0027510 | A1* | 1/2018 | Yi | H04W 52/54 455/522 |
| 2018/0091173 | A1* | 3/2018 | Axmon | H04L 1/0059 |
| 2018/0241416 | A1* | 8/2018 | Axmon | H03M 13/093 |
| 2018/0242264 | A1* | 8/2018 | Pelletier | H04W 52/346 |
| 2018/0278393 | A1* | 9/2018 | Akula | H04L 5/0064 |
| 2018/0288708 | A1* | 10/2018 | Yi | H04W 52/40 |
| 2018/0323930 | A1* | 11/2018 | Ahn | H04W 52/325 |
| 2018/0323939 | A1* | 11/2018 | Nory | H04L 1/1854 |
| 2018/0324771 | A1* | 11/2018 | Hosseini | H04W 72/0446 |
| 2018/0376495 | A1* | 12/2018 | Lee | H04W 48/12 |
| 2019/0098622 | A1* | 3/2019 | Lee | H04W 72/0446 |
| 2019/0104549 | A1* | 4/2019 | Deng | H04B 7/0617 |
| 2019/0116611 | A1* | 4/2019 | Lee | H04W 72/1278 |
| 2019/0150176 | A1* | 5/2019 | Pelletier | H04L 1/1812 370/329 |
| 2019/0159138 | A1* | 5/2019 | Lee | H04W 52/146 |
| 2019/0174547 | A1* | 6/2019 | Khoryaev | H04B 17/318 |
| 2019/0190663 | A1* | 6/2019 | Sahlin | H04L 5/0055 |
| 2019/0253978 | A1* | 8/2019 | Pelletier | H04W 52/365 |
| 2019/0268971 | A1* | 8/2019 | Talarico | H04W 88/06 |
| 2019/0288809 | A1* | 9/2019 | Iyer | H04L 1/0026 |
| 2019/0363919 | A1* | 11/2019 | Bai | H04L 27/2626 |
| 2019/0394822 | A1* | 12/2019 | Hosseini | H04W 72/14 |
| 2020/0015176 | A1* | 1/2020 | Li | H04L 1/1819 |
| 2020/0068507 | A1* | 2/2020 | Lee | H04W 80/02 |
| 2020/0169958 | A1* | 5/2020 | Lee | H04W 52/30 |
| 2020/0229205 | A1* | 7/2020 | Bharadwaj | H04W 72/0406 |

FOREIGN PATENT DOCUMENTS

| | | |
|---|---|---|
| CN | 103200663 A | 7/2013 |
| CN | 104936300 A | 9/2015 |
| CN | 105531959 A | 4/2016 |
| CN | 104429135 B | 1/2019 |
| CN | 105393608 B | 4/2019 |
| EP | 2493092 A2 | 8/2012 |
| WO | 2013165570 A1 | 11/2013 |
| WO | 2014109707 A1 | 7/2014 |
| WO | 2015148001 A1 | 10/2015 |
| WO | 2015168906 A1 | 11/2015 |

OTHER PUBLICATIONS

"New Work Item on shortened TTI and processing time for LTE," 3GPP TSG RAN Meeting #72,Busan, Korea, RP-161299, 3rd Generation Partnership Project, Valbonne, France (Jun. 13-16, 2016).
"3rd Generation Partnership Project; Technical Specification Group Radio Access Network; Evolved Universal Terrestrial Radio Access (E-UTRA); Physical layer procedures(Release 13)," 3GPP TS 36.213

(56) References Cited

OTHER PUBLICATIONS

V13.2.0, pp. 1-381, 3rd Generation Partnership Project, Valbonne, France (Jun. 2016).
"Consideration on sPUSCH Design," 3GPP TSG RAN WG1 Meeting #85, Nanjing, China, R1-165052, XP051096677, 3rd Generation Partnership Project, Valbonne, France (May 2016).
"Impact of shortened TTI on uplink transmission," 3GPP TSG RAN Meeting #85, Nanjing, China, R1-165249, XP051096185, 3rd Generation Partnership Project, Valbonne, France (May 2016).

* cited by examiner

UPLINK CHANNEL SENDING METHOD AND APPARATUS

CROSS-REFERENCE TO RELATED APPLICATIONS

This application is a continuation of International Application No. PCT/CN2016/094916, filed on Aug. 12, 2016, which is hereby incorporated by reference in its entirety.

TECHNICAL FIELD

Embodiments of the present invention relate to the wireless communications field, and in particular, to an uplink channel sending method and apparatus.

BACKGROUND

In the wireless communications field, a terminal sends uplink data to a base station through an uplink channel. To enable the base station to demodulate the uplink data sent by the terminal, the terminal sends a reference signal (RS) of the uplink channel on a time domain resource on which the uplink channel is located, and one reference signal, for example, a demodulation reference signal (DMRS), is corresponding to one symbol in time, so that the base station performs channel estimation by using the received RS, and demodulates the uplink channel based on a channel estimation result.

In a current communications system, for an uplink channel sent at each transmission time interval (TTI), uplink power control is performed when the time domain resource carries an RS of the uplink channel. However, as communications technologies evolve, the TTI may be continually shortened. If there is still at least one RS in each TTI, a total quantity of symbols occupied by the RS is increased, and system overheads are also accordingly increased. Consequently, system resource usage efficiency is reduced. If symbols occupied by the RS are reduced to reduce the system overheads, existing uplink power control does not adapt to this situation.

SUMMARY

In view of this, embodiments of the present invention provide an uplink channel sending method and apparatus, so as to adapt to uplink channel sending in a case of a shortened TTI.

A first aspect provides an uplink channel sending method, including:

determining, by a terminal, first transmission power of a first uplink channel, where the first uplink channel is one of at least one uplink channel on a first time domain resource corresponding to first duration; and sending, by the terminal, the first uplink channel at the first transmission power.

When the first time domain resource carries a reference signal of the first uplink channel, the terminal determines the first transmission power based on a path loss value, where the reference signal is used to demodulate the first uplink channel; or when the first time domain resource does not carry a reference signal of the first uplink channel, the first transmission power is less than or equal to first total transmission power, and a sum of transmission power of the at least one uplink channel on the first time domain resource is equal to the first total transmission power, where the first total transmission power is a sum of transmission power of at least one uplink channel on a second time domain resource corresponding to second duration, and a start moment of the first time domain resource is after a start moment of the second time domain resource.

A second aspect provides an uplink channel sending apparatus, applied to a terminal. The apparatus includes units or means configured to perform the steps in the first aspect.

A third aspect provides an uplink channel sending apparatus, applied to a terminal. The apparatus includes a processor and a memory. The memory is configured to store a program, and the processor invokes the program stored in the memory, to perform the method provided in the first aspect of the present invention.

A fourth aspect provides an uplink channel sending apparatus, applied to a terminal. The apparatus includes at least one processing element or chip configured to perform the method in the first aspect or the second aspect.

A fifth aspect provides a program, and the program is used to perform the method in the first aspect when being executed by a processor.

A sixth aspect provides a program product, for example, a computer readable storage medium, including the program in the fifth aspect.

It can be learned that, in the foregoing aspects, for a to-be-sent uplink channel, the terminal performs power control depending on whether a time domain resource on which the uplink channel is located carries an RS of the uplink channel, so as to meet a requirement of reducing RS overheads in a case of a shortened time domain resource.

In the foregoing aspects, the first duration is less than or equal to 0.5 ms.

In the foregoing aspects, the at least one uplink channel on the first time domain resource and the at least one uplink channel on the second time domain resource correspond to a same carrier or a same carrier group, and the carrier or the carrier group corresponds to one power amplifier; or the at least one uplink channel on the first time domain resource and the at least one uplink channel on the second time domain resource correspond to a same power amplifier.

In the foregoing aspects, when maximum transmission power allowed by the terminal on the first time domain resource is greater than or equal to the first total transmission power, the first time domain resource does not carry the reference signal of the first uplink channel; or when maximum transmission power allowed by the terminal on the first time domain resource is greater than or equal to maximum transmission power allowed by the terminal on the second time domain resource, the first time domain resource does not carry the reference signal of the first uplink channel.

In the foregoing aspects, before the terminal determines the first transmission power of the first uplink channel, the terminal configures the maximum transmission power allowed by the terminal on the first time domain resource to be equal to the maximum transmission power allowed by the terminal on the second time domain resource. The foregoing apparatus may include a unit or means configured to perform this step.

In the foregoing aspects, when the maximum transmission power allowed by the terminal on the first time domain resource is less than the first total transmission power, the terminal cancels sending of the first uplink channel, or the terminal sends, according to an instruction of a base station, the reference signal of the first uplink channel on a time domain resource on which the first uplink channel is located, or the terminal voluntarily sends, without an instruction of a base station, the reference signal of the first uplink channel on a time domain resource on which the first uplink channel is located.

In the foregoing aspects, the first time domain resource carries the reference signal of the first uplink channel in one of the following cases:

information that is sent by a base station and that indicates that the first time domain resource carries the reference signal of the first uplink channel is received;

the maximum transmission power allowed by the terminal on the first time domain resource is less than the maximum transmission power allowed by the terminal on the second time domain resource;

a quantity of uplink channels on the first time domain resource changes;

a sum of transmission power of uplink channels on the first time domain resource is greater than the maximum transmission power allowed by the terminal on the first time domain resource;

the terminal performs transmission on W contiguous time domain resources, and the W contiguous time domain resources do not carry a reference signal, where W is a preset integer greater than 1;

a preset time interval in which no transmission is performed exists between the first time domain resource and the second time domain resource; and a quantity of uplink carriers of the terminal that overlap in time domain changes.

In the foregoing aspects, when transmission of the first uplink channel overlaps with transmission of a third uplink channel in terms of time, the determining, by a terminal, first transmission power of a first uplink channel includes: determining a priority of the first uplink channel and a priority of the third uplink channel; and preferentially allocating, by the terminal, power to an uplink channel of a higher priority.

The determining, by the terminal, a priority of the first uplink channel and a priority of the third uplink channel includes:

determining, by the terminal, the priority of the first uplink channel and the priority of the third uplink channel based on information about the reference signal of the first uplink channel and information about a reference signal of the third uplink channel; or determining, by the terminal, the priority of the first uplink channel and the priority of the third uplink channel based on a receiving time of scheduling information corresponding to the first uplink channel and a receiving time of scheduling information corresponding to the third uplink channel; or determining, by the terminal, the priority of the first uplink channel and the priority of the third uplink channel based on a receiving time of downlink transmission corresponding to the first uplink channel and a receiving time of downlink transmission corresponding to the third uplink channel; or determining, by the terminal, the priority of the first uplink channel and the priority of the third uplink channel based on indication information.

The determining, by the terminal, the priority of the first uplink channel and the priority of the third uplink channel based on information about the reference signal of the first uplink channel and information about a reference signal of the third uplink channel includes:

when a third time domain resource carries the reference signal of the third uplink channel, and the first time domain resource does not carry the reference signal of the first uplink channel, determining that the priority of the third uplink channel is higher than the priority of the first uplink channel; or when the first time domain resource carries the reference signal of the first uplink channel, and a third time domain resource does not carry the reference signal of the third uplink channel, determining that the priority of the first uplink channel is higher than the priority of the third uplink channel, where the third time domain resource is a time domain resource on which the third uplink channel is located; or when the first time domain resource carries the reference signal of the first uplink channel, and a third time domain resource carries the reference signal of the third uplink channel, determining that the priority of the first uplink channel is equal to the priority of the third uplink channel; or when the first time domain resource does not carry the reference signal of the first uplink channel, and a third time domain resource does not carry the reference signal of the third uplink channel, determining that the priority of the first uplink channel is equal to the priority of the third uplink channel.

Optionally, when a sum of required power of the first uplink channel and required power of the third uplink channel is less than the first total transmission power, and when the terminal determines power of the first uplink channel and power of the third uplink channel, the terminal may allocate additional and equivalent power to the first uplink channel and the third uplink channel, or may scale up the power of the first uplink channel and the power of the third uplink channel in a same ratio, so that a sum of the power of the first uplink channel and the power of the third uplink channel is greater than the first total transmission power.

It can be learned that, when transmission of uplink channels overlaps in terms of time, the terminal can adapt to the scenario, and allocate power to each uplink channel according to the foregoing method.

In the foregoing aspects, when an overlapping area exists between the first time domain resource and a fourth time domain resource in terms of time, the method further includes: determining, by the terminal, a priority of the first time domain resource and a priority of the fourth time domain resource in the overlapping area; and preferentially performing, by the terminal, transmission on a time domain resource of a higher priority in the overlapping area. The foregoing apparatus may include a unit or means configured to perform the steps.

In the foregoing aspects, the determining, by the terminal, a priority of the first time domain resource and a priority of the fourth time domain resource in the overlapping area includes: when the overlapping area carries the reference signal on the first time domain resource and does not carry a reference signal on the fourth time domain resource, determining that the priority of the first time domain resource is higher than the priority of the fourth time domain resource; or when the overlapping area carries a reference signal on the fourth time domain resource and does not carry the reference signal on the first time domain resource, determining that the priority of the fourth time domain resource is higher than the priority of the first time domain resource; or when the duration of the first time domain resource is greater than duration of the fourth time domain resource, and the overlapping area carries the reference signal on the first time domain resource, determining that the priority of the first time domain resource is higher than the priority of the fourth time domain resource; or when duration of the fourth time domain resource is greater than the duration of the first time domain resource, and the overlapping area carries a reference signal on the fourth time domain resource, determining that the priority of the fourth time domain resource is higher than the priority of the first time domain resource.

It can be learned that, when time domain resources overlap in terms of time, the terminal can adapt to the scenario, and implement transmission in an overlapping area according to the foregoing method.

In the foregoing aspects, the terminal may obtain guaranteed power of a power amplifier corresponding to the first uplink channel, where a sum of power of at least one uplink channel corresponding to the power amplifier is less than or equal to the guaranteed power. The foregoing apparatus may include a unit or means configured to perform this step. In this way, the terminal can ensure uplink channel transmission power, and improve accuracy of demodulation by the base station.

The terminal may locally set the guaranteed power, or may obtain the guaranteed power from the base station. When obtaining the guaranteed power from the base station, the terminal may report a correspondence between the power amplifier and an uplink channel and/or a correspondence between the power amplifier and an uplink carrier/uplink carrier group.

A seventh aspect provides an uplink channel sending control method, including: determining, by a base station, whether a reference signal of a first uplink channel of a terminal is to be sent on a first time domain resource corresponding to first duration, where the reference signal is used to demodulate the first uplink channel; and when determining that the reference signal is to be sent, sending, by the base station, instruction information to the terminal, where the instruction information is used to instruct the terminal to send the reference signal of the first uplink channel on the first time domain resource.

Optionally, the base station determines, in the following manners, whether the reference signal of the first uplink channel of the terminal needs to be sent on the first time domain resource corresponding to the first duration:

The base station determines whether a difference is greater than a first threshold, where the difference is a difference between a quantity of uplink carriers sent by the terminal on the first time domain resource and a quantity of uplink carriers sent by the terminal on a second time domain resource, or the difference is a difference between a quantity of uplink channels sent by the terminal on the first time domain resource and a quantity of uplink channels sent by the terminal on a second time domain resource; and when the difference is greater than the first threshold, the base station determines that the reference signal of the first uplink channel of the terminal is to be sent on the first time domain resource corresponding to the first duration.

An eighth aspect provides an uplink channel sending control apparatus, applied to a base station. The apparatus includes units or means configured to perform the steps in the seventh aspect.

A ninth aspect provides an uplink channel sending control apparatus, applied to a base station. The apparatus includes a processor and a memory. The memory is configured to store a program, and the processor invokes the program stored in the memory, to perform the method provided in the seventh aspect of the present invention.

A tenth aspect provides an uplink channel sending control apparatus, applied to a base station. The apparatus includes at least one processing element or chip configured to perform the method in the seventh aspect.

An eleventh aspect provides a program, and the program is used to perform the method in the seventh aspect when being executed by a processor.

A twelfth aspect provides a program product, for example, a computer readable storage medium, including the program in the eleventh aspect.

It can be appreciated that, in the foregoing aspects, for a to-be-sent uplink channel, the terminal performs power control depending on whether a time domain resource on which the uplink channel is located carries an RS of the uplink channel, so as to reduce RS overheads in a case of a shortened time domain resource. In addition, the base station may predetermine and indicate whether the terminal sends the RS of the uplink channel, so as to reduce RS overheads in a case of a shortened time domain resource.

BRIEF DESCRIPTION OF DRAWINGS

To describe technical solutions in embodiments of the present invention more clearly, the following briefly describes the accompanying drawings. The accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
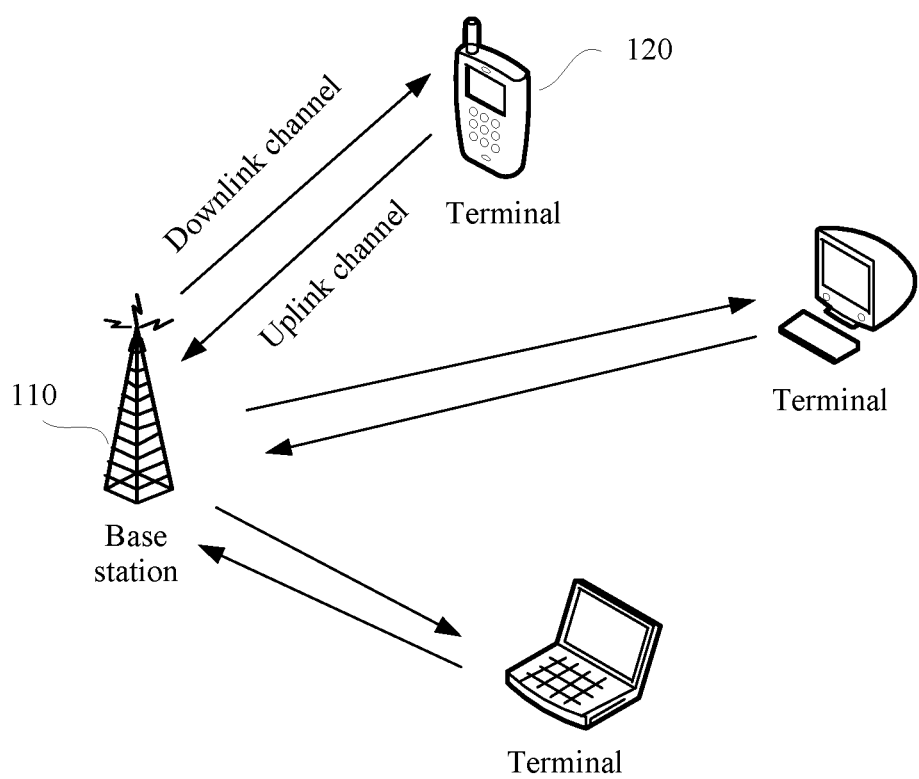
FIG. 1 is a block diagram of a communications system according to an embodiment of the present invention.

The following clearly describes technical solutions in embodiments of the present invention with reference to the accompanying drawings. The described embodiments are merely some but not all of the embodiments of the present invention. Other embodiments obtained by a person of ordinary skill in the art based on the described embodiments of the present invention without creative efforts may fall within the protection scope of the present invention.

The following describes some terms in the present invention to facilitate understanding of a person skilled in the art.

(1) Terminal: also referred to as user equipment (UE), a device providing a user with voice and/or data connectivity, for example, a handheld device or an in-vehicle device having a wireless connection function. Common terminals include, for example, a mobile phone, a tablet computer, a laptop computer, a palmtop computer, a mobile Internet device (MID), and a wearable device such as a smartwatch, a smart band, or a pedometer.

(2) Base station: also referred to as a radio access network (RAN) device, a device that connects a terminal to a wireless network, including but is not limited to an evolved NodeB (eNB), a radio network controller (RNC), a NodeB (NB), a base station controller (BSC), a base transceiver station (BTS), a home eNodeB (HNB), and a baseband unit (BBU). In addition, a base station may further include a Wi-Fi access point (AP) and the like.

(3) "A plurality of" means two or more than two. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(4) Time domain resource: a channel transmission time unit, for example, may be a TTI. Herein, a TTI whose length is less than 1 ms is referred to as a short TTI, for example, a TTI less than or equal to 0.5 ms. A TTI whose length is equal to 1 ms is referred to as a conventional TTI. Lengths of different time domain resources may be the same or may be different. For example, a first time domain resource is a short TTI, and a second time domain resource is a conventional TTI. An $X^{th}$ time domain resource corresponding to $X^{th}$ duration is a channel transmission time in the following. X is a positive integer. Duration of the short TTI is less than one subframe or 1 ms, for example, 0.5 ms, a length of seven symbols, a length of six symbols, a length of five symbols, a length of four symbols, a length of three symbols, a length of two symbols, or a length of one symbol. In a Long Term Evolution (LTE) system, various physical channels may be transmitted within a transmission time period of specific duration. Further, the physical channels may be transmitted on all or a part of time-frequency domain resources in the transmission time period.

(5) Symbol: an orthogonal frequency division multiplexing (OFDM) symbol or a single carrier frequency division multiple access (SC-FDMA) symbol. A symbol is an orthogonal frequency division multiple access (OFDMA) symbol or a single carrier frequency division multiple access (SC-FDMA) symbol in an LTE system with 15 kHz sub-carrier spacing, or a symbol in a communications system with a larger subcarrier occupancy frequency. This is not limited in the embodiments.

FIG. 1 is a schematic diagram of a communications system according to an embodiment of the present invention. As shown in FIG. 1, the communications system includes a base station 110. A terminal 120 accesses a wireless network by using the base station 110, so as to obtain a service of an external network (for example, the Internet) by using the wireless network, or communicate with another terminal by using the wireless network. In a downlink direction, when the base station 110 has data to be sent to the terminal 120, the base station 110 sends the data to the terminal 120 through a downlink channel. In an uplink direction, when the terminal 120 has data to be sent, the terminal 120 sends the data to the base station 110 through an uplink channel. The uplink channel herein may include an uplink control channel, for example, a physical uplink control channel (PUCCH) or a short PUCCH (sPUCCH); or may include an uplink data channel, for example, a physical uplink shared channel (PUSCH) or a short PUSCH (sPUSCH). The PUCCH or the sPUCCH is used to carry control information, and the PUSCH or the sPUSCH is used to carry service data. Certainly, the control information may also be carried on the PUSCH or the sPUSCH. Content carried on a channel is not limited in this application. The sPUCCH is a control channel on a time domain resource corresponding to duration that is less than 1 ms (for example, less than or equal to 0.5 ms). In other words, the sPUCCH is a channel used to carry uplink control information on the time domain resource corresponding to the duration that is less than 1 ms. The sPUSCH is a data channel on a time domain resource corresponding to duration that is less than 1 ms (for example, less than or equal to 0.5 ms). In other words, the sPUSCH is a channel used to carry uplink data information and/or uplink control information on the time domain resource corresponding to the duration that is less than 1 ms.

Currently, a power control process when the terminal sends an uplink channel usually includes: The terminal prepares data or uplink control information that needs to be carried on an uplink channel, and then calculates, based on a path loss, required transmission power of all uplink channels of the terminal in a current TTI. If a sum of the required transmission power of all the uplink channels exceeds maximum transmission power allowed by the terminal, the terminal scales down power of all or some uplink channels based on a channel type priority or a priority of the carried uplink control information. Specifically, the terminal preferentially allocates power to a channel of a higher priority, and then allocates power to a channel of a lower priority. If channels have a same priority, transmission power is reduced in a same ratio, so as to ensure that a sum of transmission power of all the uplink channels does not exceed the maximum transmission power allowed by the terminal. Afterward, all or some uplink channels are sent at transmission power allocated based on a priority. It can be understood that, when the sum of the required transmission power of all the uplink channels exceeds the maximum transmission power allowed by the terminal, no power may be allocated to the uplink channel of a lower priority, or power allocated to the uplink channel of a lower priority is zero, and finally the uplink channel of a lower priority is not sent.

In the foregoing uplink channel sending process, to enable the base station to demodulate an uplink channel, an RS of the uplink channel is sent on a time domain resource on which the uplink channel is located. The base station performs channel estimation by using the received RS, and then demodulates the uplink channel by using a channel estimation result.

Currently, in a Long Term Evolution (LTE) system, a time domain resource of the terminal is a TTI, and a length of the TTI is 1 ms. In addition, for an uplink channel sent on each time domain resource, the time domain resource carries an RS of the uplink channel, and the base station demodulates the uplink channel by using the RS. However, as communications technologies develop, duration of the time domain resource becomes shorter, for example, less than or equal to 0.5 ms. If an RS of each to-be-sent uplink channel is sent on a time domain resource, RS overheads are relatively large, and consequently system resource usage efficiency is affected. Therefore, the RS overheads are expected to be reduced. However, to reduce the RS overheads, a case occurs in which RSs of uplink channels on different time domain resources are a same RS. When the base station demodulates an uplink channel on a current transmission resource by using an RS transmitted by the terminal on a previous time domain resource, if the terminal performs improper uplink power control, the base station cannot perform demodulation or performs incorrect demodulation.

In view of this, an embodiment of the present invention provides an uplink channel sending method. For a to-be-sent uplink channel, different power control methods are performed depending on whether a time domain resource on which the uplink channel is located carries an RS of the uplink channel, so as to ensure that the base station can correctly receive the uplink channel while a requirement of reducing RS overheads is met in a case of a shortened time domain resource. When RSs of uplink channels on a plurality of time domain resources are a same RS, in other words, when a time domain resource on which a to-be-sent uplink channel is located does not carry an RS of the uplink channel, the terminal uses a sum of transmission power of at least one uplink channel in a previous time domain resource as a power allocation prerequisite, so as to resolve a problem that the base station cannot demodulate the uplink channel because an uplink channel on a current time domain resource and an RS of the uplink channel have different phases, thereby improving accuracy of uplink channel demodulation by the base station.

Figure 2:
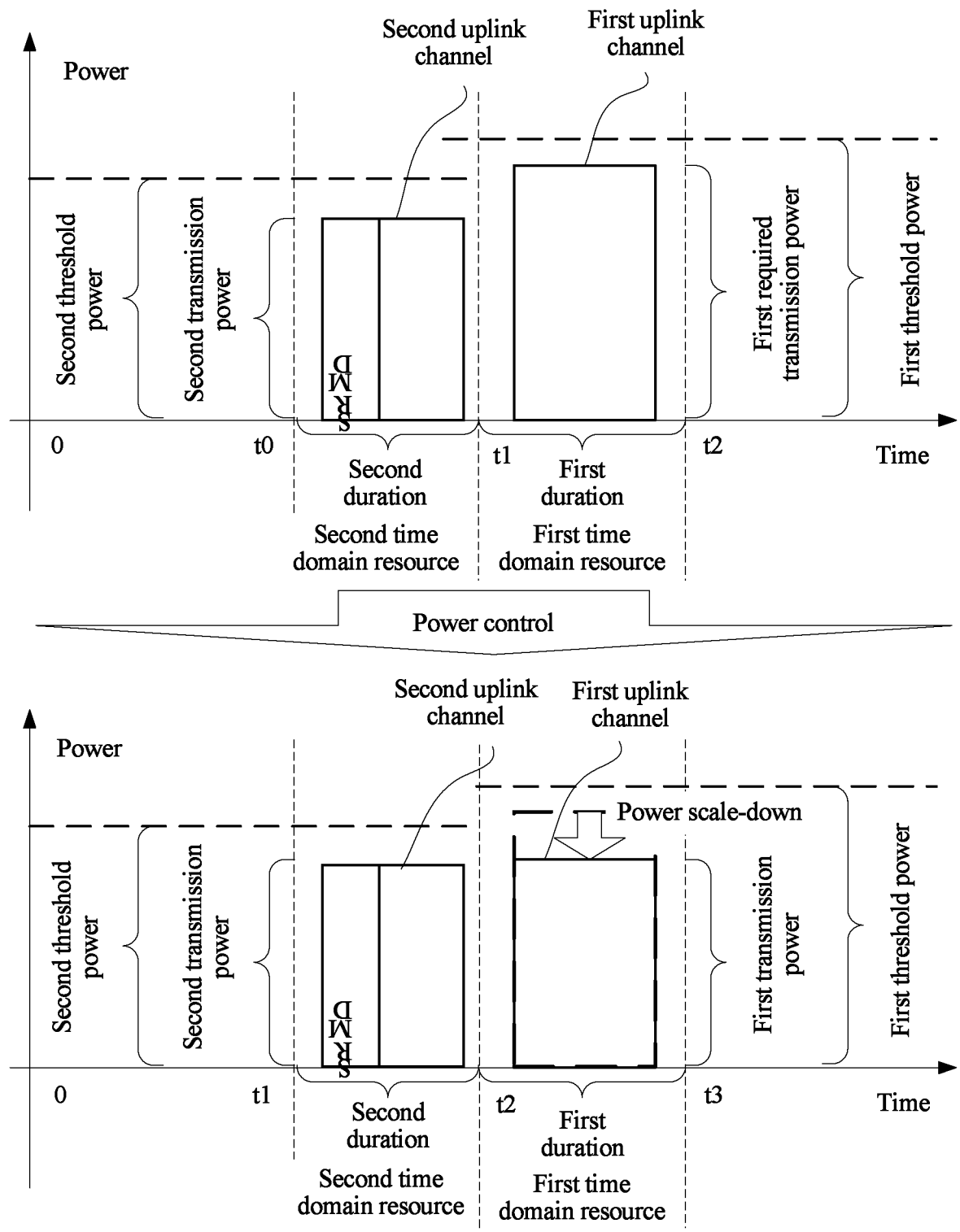
FIG. 2 is a schematic diagram of an uplink channel sending method according to an embodiment of the present invention.

FIG. 2 is a schematic diagram of an uplink channel sending method according to an embodiment of the present invention. As shown in FIG. 2, a terminal sends a first uplink channel on a first time domain resource. Before that, the terminal sends a second uplink channel on a second time domain resource. The first time domain resource is from a moment t1 to a moment t2, and the second time domain resource is from a moment t0 to the moment t1. Duration of the first time domain resource may be equal or not equal to duration of the second time domain resource. To be specific, the terminal sends the first uplink channel to a base station at first transmission power on the first time domain resource, and the duration of the first time domain resource is t2-t1, or in other words, first duration is equal to t2-t1. The terminal sends the second uplink channel to the base station at second transmission power on the second time domain resource before the first time domain resource, and the duration of the second time domain resource is t1-t0, or in other words, second duration is equal to t1-t0. The first time domain resource does not carry an RS of the first uplink channel, and the second time domain resource carries the RS of the first uplink channel. In other words, the base station demodulates the first uplink channel by using the RS on the second time domain resource. Certainly, the RS may also be used by the base station to demodulate the second uplink channel. In other words, the RS of the first uplink channel and an RS of the second uplink channel may be a same RS. Therefore, the RS may also be referred to as the RS of the second uplink channel. To be specific, an RS of an $n^{th}$ channel is an RS used to demodulate the $n^{th}$ channel, and may be located on a time domain resource on which the $n^{th}$ channel is located, or may be located on another time domain resource, where n is a positive integer.

It should be noted that, when the first uplink channel and the second uplink channel are of a same channel type, for example, when both the first uplink channel and the second uplink channel are uplink control channels or uplink data channels, the RS of the first uplink channel and the RS of the second uplink channel may be a same RS. Otherwise, the RS of the first uplink channel and the RS the second uplink channel are different RSs.

Optionally, when being of a same channel type, the second uplink channel and the first uplink channel occupy a same frequency domain resource, and use a same modulation and coding scheme is used for the second uplink channel and the first uplink channel.

Because the first time domain resource on which the first uplink channel is located does not carry the RS of the first uplink channel, the following conditions are met when the terminal determines the transmission power of the first uplink channel, so as to resolve a problem that uplink channel demodulation on a current time domain resource fails because an uplink channel of the current time domain resource and an RS of the uplink channel have different phases.

The first transmission power is less than or equal to first total transmission power, and a sum of transmission power of at least one uplink channel on the first time domain resource is equal to the first total transmission power. The first total transmission power is a sum of transmission power of at least one uplink channel on the second time domain resource.

In addition, during power allocation, the total power of all channels on the first time domain resource is less than maximum transmission power allowed by the terminal on the first time domain resource, and the total power of all channels on the second time domain resource is less than maximum transmission power allowed by the terminal on the second time domain resource, which are respectively first threshold power and second threshold power shown in FIG. 2. This part is known to a person skilled in the art, and details are not described herein.

An example in which the second uplink channel on the second time domain resource carries an RS is used above for description. Certainly, the second uplink channel on the second time domain resource may not carry an RS, but power allocation is performed still in the foregoing condition.

An example in which only one uplink channel is sent on the first time domain resource and the second time domain resource is used above for description. Certainly, more than one uplink channel may be sent on the first time domain resource and the second time domain resource. When more than one uplink channel is sent on the first time domain resource and the second time domain resource, the foregoing first uplink channel is one of the at least one uplink channel on the first time domain resource, and the foregoing second uplink channel is one of the at least one uplink channel on the second time domain resource. In this case, the sum of the transmission power of the at least one uplink channel on the first time domain resource is equal to the sum of the transmission power of the at least one uplink channel on the second time domain resource. The at least one uplink channel on the first time domain resource and the at least one uplink channel on the second time domain resource herein correspond to a same power amplifier (PA), or correspond to a same carrier or a same carrier group. The same carrier or the same carrier group corresponds to a same PA. In other words, sums of transmission power of uplink channels corresponding to the same PA on the first time domain resource and the second time domain resource are equal, or sums of transmission power of uplink channels corresponding to the same carrier or the same carrier group on the first time domain resource and the second time domain resource are equal.

It is assumed that M uplink channels correspond to a first PA on the first time domain resource, and N uplink channels correspond to the first PA on the second time domain resource. In this case, the foregoing condition is that a sum of transmission power of the M uplink channels is equal to a sum of power of the N uplink channels. Similarly, it is assumed that M uplink channels correspond to a first carrier (or carrier group) on the first time domain resource, and N uplink channels correspond to the first carrier (or carrier group) on the second time domain resource. In this case, the foregoing condition is that a sum of transmission power of the M uplink channels is equal to a sum of power of the N uplink channels. M and N are positive integers greater than or equal to 1, and M may be equal to or not equal to N.

It should be noted that the first time domain resource and the second time domain resource are adjacent time domain resources, which is merely used as an example. Alternatively, the first time domain resource may not be adjacent to the second time domain resource. In other words, the first time domain resource and the second time domain resource may be separated by at least one time domain resource, and the at least one time domain resource does not carry the RS of the first uplink channel.

In addition, the first time domain resource and the second time domain resource may be a same time domain resource, or may be different time domain resources; and may be conventional TTIs, or may be short TTIs.

It can be learned that, in this embodiment of this application, when the terminal sends a plurality of uplink channels to the base station on a plurality of time domain resources, in order that the base station can demodulate the plurality of uplink channels by using a same RS, sums of transmission power of at least one uplink channel of the terminal on the plurality of time domain resources are equal. The at least one uplink channel may correspond to a same carrier or a same carrier group, or may correspond to a same PA. The same carrier or the same carrier group may be a carrier or a carrier group corresponding to a same PA.

Figure 3:
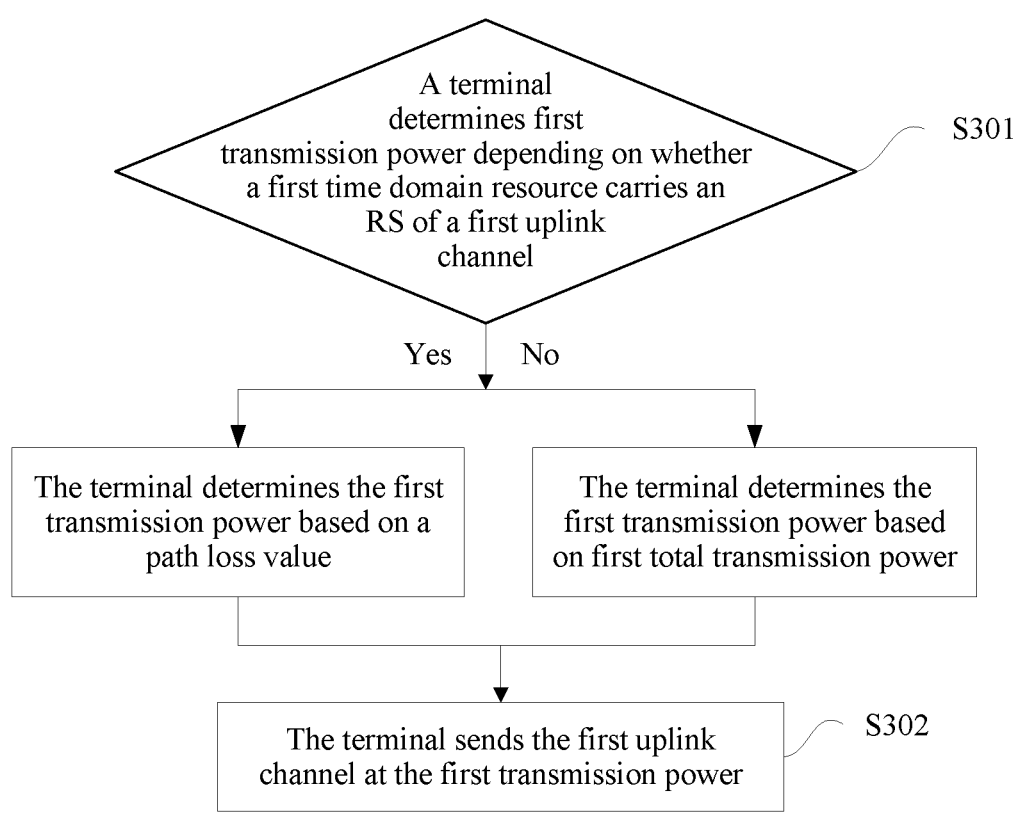
FIG. 3 is a flowchart of an uplink channel sending method according to an embodiment of the present invention.

FIG. 3 is a flowchart of an uplink channel sending method according to an embodiment of the present invention. As shown in FIG. 3, the method includes the following steps:

S301. A terminal determines first transmission power of a first uplink channel, where the first uplink channel is one of at least one uplink channel on a first time domain resource corresponding to first duration.

When the first time domain resource carries an RS of the first uplink channel, the terminal determines the first transmission power based on a path loss value; or when the first time domain resource does not carry an RS of the first uplink channel, the first transmission power is less than or equal to first total transmission power, and a sum of transmission power of the at least one uplink channel on the first time domain resource is equal to the first total transmission power. The first total transmission power is a sum of transmission power of at least one uplink channel on a second time domain resource corresponding to second duration, and a start moment of the first time domain resource is after a start moment of the second time domain resource.

S302. The terminal sends the first uplink channel at the first transmission power.

Optionally, if a start moment corresponding to an uplink channel is a last symbol of the first time domain resource, power of the uplink channel may not be included in the first total transmission power.

Optionally, that the terminal determines the first transmission power based on a path loss value when the first time domain resource carries an RS of the first uplink channel specifically includes: determining, by the terminal, the first transmission power based on information such as the path loss value, configured transmission power of UE on a current carrier, or a power control command. This part is known to a person skilled in the art, and details are not described herein.

Optionally, when the first time domain resource does not carry an RS of the first uplink channel, the terminal determines the first transmission power based on the first total transmission power. For example, only the first uplink channel is on the first time domain resource, the first transmission power is equal to the first total transmission power. When P uplink channels are on the first time domain resource in addition to the first uplink channel, and Q uplink channels in the P uplink channels and the first uplink channel are on a same carrier or a same carrier group, or correspond to a same PA, a sum of the first transmission power and transmission power of the Q uplink channels is equal to the first total transmission power. The terminal allocates transmission power to the first uplink channel and the P uplink channels based on priorities of the first uplink channel and the P uplink channels, so that the sum of the first transmission power and the transmission power of the Q uplink channels is equal to the first total transmission power. P is greater than or equal to Q, and P and Q are integers greater than or equal to 0.

Optionally, the terminal may first determine required power of the first uplink channel based on information such as the path loss value by using a method the same as that in the prior art. Then the terminal determines, based on the required power of the first uplink channel and the first total transmission power, the first transmission power finally used by the first uplink channel. For example, when a sum of the required power of the first uplink channel and required power of the Q uplink channels is greater than the first total transmission power, the terminal allocates transmission power to the first uplink channel and the Q uplink channels based on priorities of the first uplink channel and the Q uplink channels, so that the sum of the first transmission power and the transmission power of the Q uplink channels is equal to the first total transmission power. When the sum of the required power of the first uplink channel and the required power of the Q uplink channels is less than the first total transmission power, the terminal allocates, to the first uplink channel and at least one of the Q uplink channels, power that is greater than the required power of the first uplink channel, so that the sum of the first transmission power and the transmission power of the Q uplink channels is equal to the first total transmission power. When the sum of the required power of the first uplink channel and the required power of the Q uplink channels is equal to the first total transmission power, the terminal allocates, to the first uplink channel and the Q uplink channels, the first transmission power required by the first uplink channel and the Q uplink channels.

Optionally, the terminal determines required power of the first uplink channel based on the first total transmission power and information such as the path loss value. Then the terminal determines, based on the required power of the first uplink channel and the first total transmission power, the first transmission power finally used by the first uplink channel. For example, required power of the first uplink channel=larger value of {first total transmission power, first sub-required transmission power}. The first sub-required transmission power is a required transmission power value calculated according to the prior art, and details are not described herein. Then, when a sum of the required power of the first uplink channel and required power of the Q uplink channels is greater than the first total transmission power, the terminal allocates transmission power to the first uplink channel and the Q uplink channels based on priorities of the first uplink channel and the P uplink channels, so that the sum of the first transmission power and the transmission power of the Q uplink channels is equal to the first total transmission power. When the sum of the required power of the first uplink channel and the required power of the Q uplink channels is equal to the first total transmission power, the terminal allocates, to the first uplink channel and the Q uplink channels, first transmission power required by the first uplink channel and the Q uplink channels.

It should be noted that a time domain resource on which the P uplink channels are located may be the first time domain resource on which the first uplink channel is located, or may be another time domain resource that overlaps with the first time domain resource on which the first uplink channel is located. Duration of the time domain resource on which the P uplink channels are located may be the same as or may be different from the first duration of the first time domain resource. This is not limited herein.

When the foregoing method is applicable to short-TTI transmission, RS overheads can be effectively reduced, and accuracy of uplink channel demodulation by the base station can also be improved. In this case, the first duration is less than or equal to 0.5 ms. The second duration is not limited, and may be a conventional TTI, namely, 1 ms; or may be a short TTI, for example, less than or equal to 0.5 ms.

Optionally, when the second time domain resource may carry the RS of the first uplink channel, the first uplink channel may be demodulated by using the RS on the second time domain resource. Alternatively, when the second time domain resource does not carry the RS of the first uplink channel, the first uplink channel is demodulated by using an RS on a time domain resource before the second time domain resource. For power allocation to an uplink channel on the second time domain resource and power allocation to the first uplink channel, total transmission power of at least one uplink channel on a previous time domain resource needs to be considered, and details are not described herein again.

It should be noted that, when only one uplink channel is sent on the second time domain resource, the first total transmission power is transmission power of the uplink channel. In addition, when only one uplink channel, namely, the first uplink channel, is sent on the first time domain resource, the sum of the transmission power of the at least one uplink channel on the first time domain resource is the transmission power of the first uplink channel. In this case, the transmission power of the first uplink channel is equal to the transmission power of the uplink channel on the second time domain resource. In addition, for a PA of the terminal, when only one uplink channel corresponding to the PA is sent on the second time domain resource, the first total transmission power is transmission power of the uplink channel. In addition, when only one uplink channel corresponding to the PA, namely, the first uplink channel, is sent on the first time domain resource, the sum of the transmission power of the at least one uplink channel on the first time domain resource is the transmission power of the first uplink channel. In this case, the transmission power of the first uplink channel is equal to the transmission power of the uplink channel on the second time domain resource. For a same carrier or a same carrier group, cases are similar, and details are not described herein again.

Figure 4:
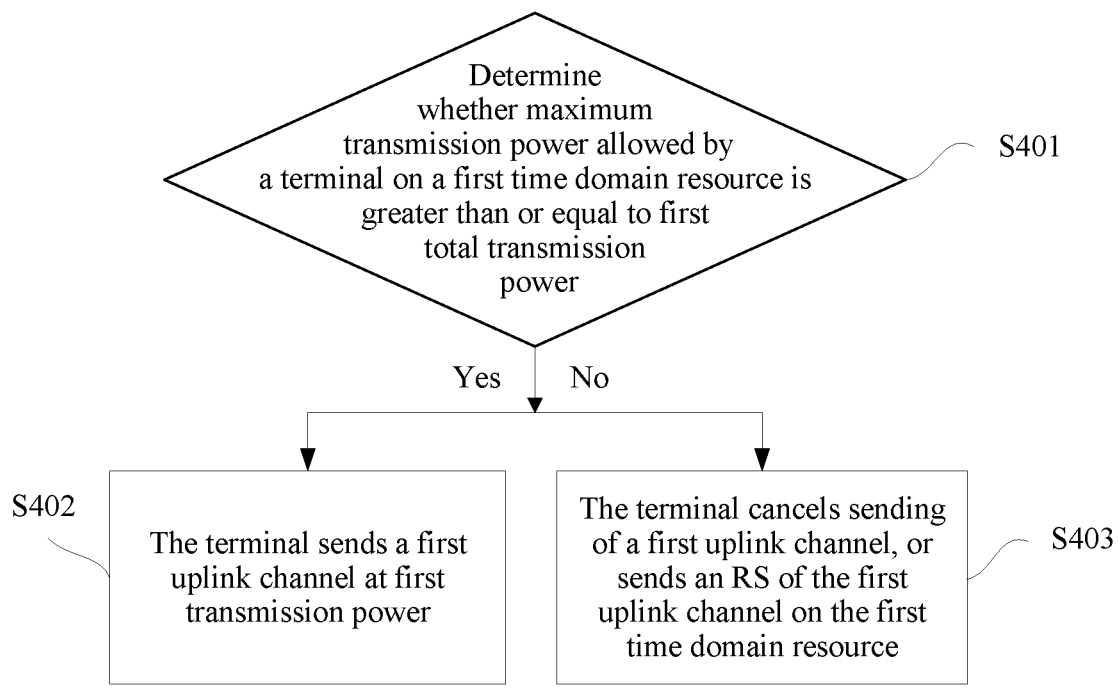
FIG. 4 is a flowchart of another uplink channel sending method according to an embodiment of the present invention.

FIG. 4 is a flowchart of another uplink channel sending method according to an embodiment of the present invention. As shown in FIG. 4, the method is executed by a terminal, and includes the following steps.

S401. Determine whether maximum transmission power allowed by a terminal on a first time domain resource is greater than or equal to first total transmission power.

S402. When the maximum transmission power allowed by the terminal on the first time domain resource is greater than or equal to the first total transmission power, send a first uplink channel at first transmission power, where the first time domain resource does not carry an RS of the first uplink channel. In this case, the first transmission power meets a requirement on the first transmission power imposed when the first time domain resource does not carry the RS of the first uplink channel in the embodiment shown in FIG. 3.

S403. When the maximum transmission power allowed by the terminal on the first time domain resource is less than the first total transmission power, cancel sending of the first uplink channel, or send an RS of the first uplink channel on the first time domain resource.

In the foregoing method, before performing power allocation, the terminal first determines whether the maximum transmission power allowed by the terminal on the first time domain resource is less than, or greater than, or equal to the first total transmission power. If the maximum transmission power is less than the first total transmission power, it indicates that a sum of transmission power of at least one uplink channel on the current first time domain resource cannot be equal to the first total transmission power regardless of how the terminal allocates power. Therefore, if only the first uplink channel is sent, a base station cannot demodulate the first uplink channel because the first uplink channel and the RS of the first uplink channel have different phases, and consequently sending of the first uplink channel can be canceled, thereby avoiding a power waste of the terminal caused when the terminal sends an uplink channel but the base station cannot demodulate the uplink channel. Alternatively, the RS of the first uplink channel may be sent on the first time domain resource, so that the base station can demodulate the first uplink channel based on the RS of the first uplink channel sent on the first time domain resource.

Figure 5:
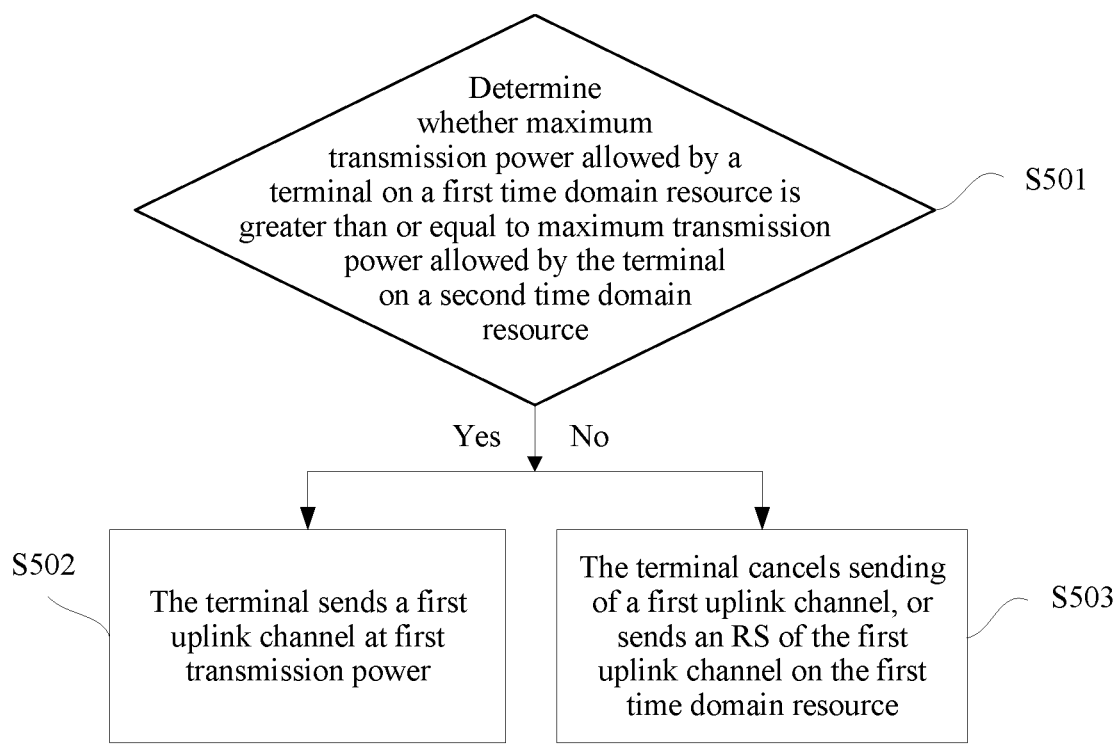
FIG. 5 is a flowchart of another uplink channel sending method according to an embodiment of the present invention.

Further referring to FIG. 5, step S401 may be replaced with step S501, other steps in FIG. 5 are similar to other steps in FIG. 4, and details are not described herein again.

S501. Determine whether maximum transmission power allowed by a terminal on a first time domain resource is greater than or equal to maximum transmission power allowed by the terminal on a second time domain resource.

S502. When the maximum transmission power allowed by the terminal on the first time domain resource is greater than or equal to the maximum transmission power allowed by the terminal on the second time domain resource, send a first uplink channel at first transmission power, where the first time domain resource does not carry an RS of the first uplink channel. In this case, the first transmission power meets a requirement on the first transmission power imposed when the first time domain resource does not carry the RS of the first uplink channel in the embodiment shown in FIG. 3.

S503. When the maximum transmission power allowed by the terminal on the first time domain resource is less than the maximum transmission power allowed by the terminal on the second time domain resource, cancel sending of the first uplink channel, or send an RS of the first uplink channel on the first time domain resource.

Step S501 may be used to replace step S401 because first total transmission power is less than or equal to the maximum transmission power allowed by the terminal on the second time domain resource. If the maximum transmission power allowed by the terminal on the second time domain resource is less than the maximum transmission power allowed by the terminal on the first time domain resource, the first total transmission power is less than or equal to the maximum transmission power allowed by the terminal on the first time domain resource. In other words, the maximum transmission power allowed by the terminal on the first time domain resource is greater than or equal to the first total transmission power. Therefore, meeting a condition of step S501 means that a condition of step S401 may be met. Therefore, step S501 may be used to replace step S401.

Optionally, a predefined manner may be used to configure the maximum transmission power allowed by the terminal on the first time domain resource to be equal to the maximum transmission power allowed by the terminal on the second time domain resource. This can ensure that conditions of step S401 and step S501 are met. Therefore, in an embodiment, the terminal may configure the maximum transmission power allowed by the terminal on the first time domain resource to be equal to the maximum transmission power allowed by the terminal on the second time domain resource. In this way, the terminal can directly perform steps S402 and S502 of sending a first uplink channel at first transmission power, without performing steps S401 and S501. In addition, the first time domain resource does not carry the RS of the first uplink channel.

In an implementation, maximum transmission power allowed by the terminal on a plurality of time domain resources may be set to a same shared power threshold. The shared power threshold is a minimum power threshold in power thresholds on the time domain resources. To be specific, shared power threshold=min {first power threshold, . . . , and $k^{th}$ power threshold}, where k is a positive integer greater than 1, and the $k^{th}$ power threshold is maximum transmission power allowed by the terminal on a $k^{th}$ time domain resource. The terminal may determine the $k^{th}$ power threshold based on scheduling information sent by a base station.

For example, the terminal determines a lower limit value of the $k^{th}$ power threshold based on a carrier E-UTRA band on which the $k^{th}$ time domain resource is located, a channel bandwidth, and a resource block indicated by the scheduling information sent by the base station. The terminal determines an upper limit value of the $k^{th}$ power threshold based on a maximum upper limit value configured by the base station and a power level of the terminal. The terminal selects a value between the upper limit value and the lower limit value as the $k^{th}$ power threshold.

In another implementation, maximum transmission power allowed by the terminal on k time domain resources may be set to a same shared power threshold. The shared power threshold is a time domain resource having an earliest sending start moment, or the shared power threshold is a minimum power threshold of power thresholds on time domain resources having top j sending start moments. In other words, shared power threshold=min {first power threshold, . . . , and $j^{th}$ power threshold}, where j is a positive integer greater than 1 and less than or equal to k, and the $j^{th}$ power threshold is maximum transmission power allowed by the terminal on a $j^{th}$ time domain resource. An implementation of determining the $j^{th}$ power threshold is the same as a previous implementation, and details are not described herein again.

Figure 6A:
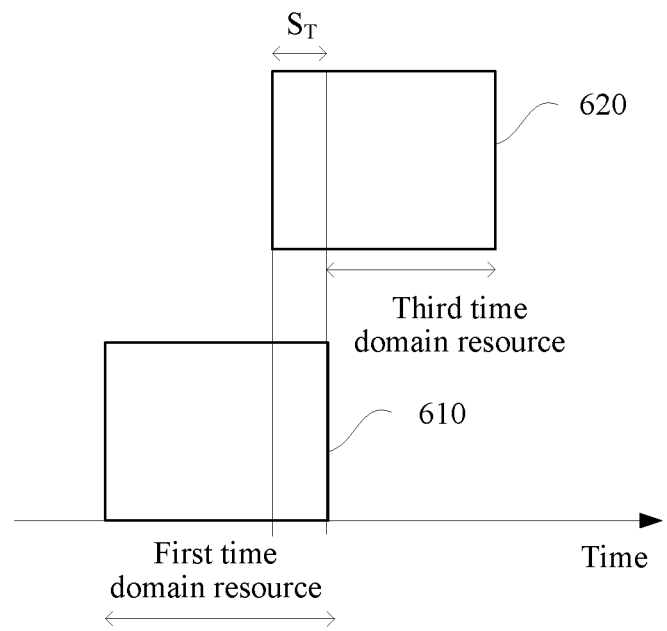
FIG. 6A is a schematic diagram of a time domain resource on which an uplink channel is located according to an embodiment of the present invention.
Figure 6B:
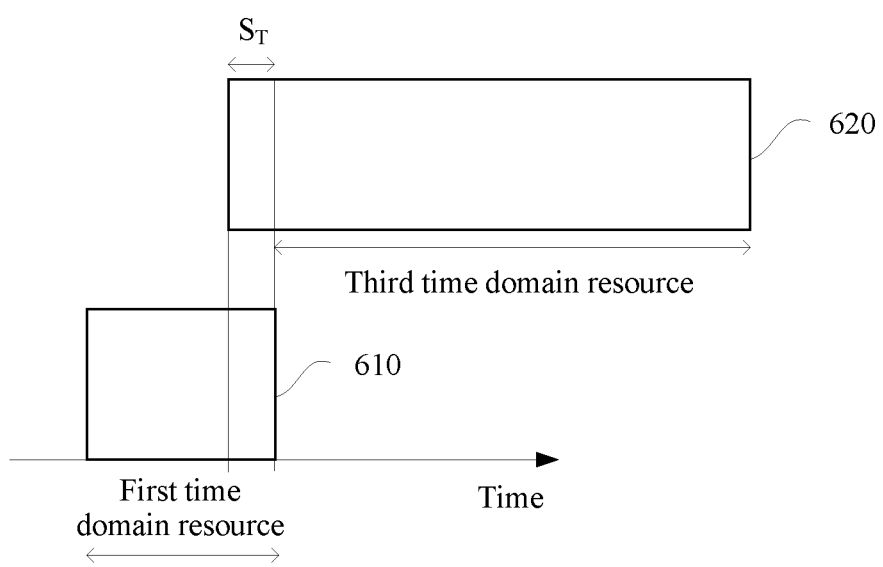
FIG. 6B is another schematic diagram of a time domain resource on which an uplink channel is located according to an embodiment of the present invention.

FIG. 6A is a schematic diagram of an uplink channel transmission overlapping scenario according to an embodiment of the present invention. As shown in FIG. 6A, duration of a time resource on which an uplink channel 610 is located is the same as duration in which an uplink channel 620 is located. As shown in FIG. 6B, the duration in which the uplink channel 610 is located may be different from the duration in which the uplink channel 620 is located. As shown in FIG. 6A or FIG. 6B, an overlapping area ST exists between a transmission time of the uplink channel 610 and a transmission time of the uplink channel 620, and transmission of the uplink channel 610 and transmission of the uplink channel 620 overlap. The overlapping may be partial overlapping or complete overlapping, and the partial overlapping is used as an example herein. When the terminal is to allocate power to the uplink channel 610 and the uplink channel 620, a sum of power of the two uplink channels in the overlapping area needs to meet a power requirement in the foregoing embodiment. To meet this requirement, the power of the two uplink channels may need to be controlled. In this case, if a channel priority is considered, transmission power of a channel of a higher priority can be preferentially ensured during power allocation.

Assuming that the uplink channel 610 is the first uplink channel in the foregoing embodiment and the overlapping area is located in the foregoing first time domain resource, a part of the uplink channel 620 is located on the first time domain resource, and the uplink channel 620 can be understood as a channel on the first time domain resource. When determining a transmission power of the first uplink channel (S301), in addition to determining the transmission power of the first uplink channel, the terminal further determines transmission power of a third uplink channel (for example, the uplink channel 620) occupying a time domain resource that overlaps with a time domain resource for transmitting the first uplink channel, and power finally allocated to the first uplink channel is first transmission power.

Figure 7:
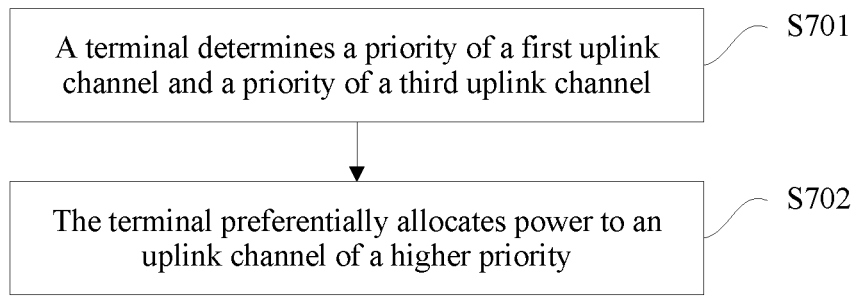
FIG. 7 is a flowchart of another uplink channel sending method according to an embodiment of the present invention.

Further referring to FIG. 7, in this embodiment, the foregoing uplink channel sending method further includes the following steps:

S701. A terminal determines a priority of a first uplink channel and a priority of a third uplink channel.

S702. The terminal preferentially allocates power to an uplink channel of a higher priority.

It can be learned that the first uplink channel is on a first time domain resource, and in addition, transmission of another uplink channel may overlap with transmission of the first uplink channel on the first time domain resource, and transmission of an uplink channel may also overlap with transmission of the first uplink channel on another time domain resource. The another time domain resource and the first time domain resource may be a same time domain resource or may be different time domain resources. Duration of the another time domain resource may be the same as or may be different from first duration of the first time domain resource. The another time domain resource may be a plurality of time domain resources. The following uses a third uplink channel on a time domain resource as an example. When determining transmission power of the first uplink channel, the terminal determines transmission power of the uplink channel, and finally determines that the power allocated to the first uplink channel is first transmission power. Power may be allocated to these channels based on a channel priority, so as to ensure sending of a channel of a higher priority.

In step S701, the terminal may determine the priority of the first uplink channel and the priority of the third uplink channel in a plurality of manners.

In a first manner, the terminal determines the priority of the first uplink channel and the priority of the third uplink channel based on information about an RS of the first uplink channel and information about an RS of the third uplink channel. A time domain resource on which the first uplink channel is located is the first time domain resource, and a time domain resource on which the third uplink channel is located is a third time domain resource. The first time domain resource and the third time domain resource completely overlap or partially overlap in terms of time, and duration of an overlapping time domain resource between the first time domain resource and the third time domain resource is less than or equal to a threshold. It may be considered that the third time domain resource is the first time domain resource. In other words, the third time domain resource and the first time domain resource may be time domain resources with a same number. The threshold herein may be 33.21 µs, 32.47 µs, or another value. For example, the terminal determines the priority of the first uplink channel and the priority of the third uplink channel depending on whether the first time domain resource carries the RS of the first uplink channel and the third time domain resource carries the RS of the third uplink channel. Optionally, assuming that a priority of a channel without an RS is higher than a priority of a channel with an RS, it can be preferentially ensured that power of the channel without an RS meets the foregoing condition requirement. In other words, power is preferentially allocated to the channel without an RS. For example, when the first time domain resource carries the RS of the first uplink channel but the third time domain resource does not carry the RS of the third uplink channel, and when a sum of required power of the first uplink channel and required power of the third uplink channel is greater than first total transmission power, power is preferentially allocated to the third uplink channel. If there is remaining power after the power is allocated to the third uplink channel (for example, first total transmission power−power of the third uplink channel>0), power is allocated to the first uplink channel. Otherwise, the first transmission power of the first uplink channel is 0, and vice versa. When the sum of the required power of the first uplink channel and the required power of the third uplink channel is less than the first total transmission power, and when the terminal determines power of the first uplink channel and power of the third uplink channel, the terminal allocates, to the first uplink channel or the third uplink channel, power that is greater than required power of an uplink channel. For example, the terminal allocates, to a channel on a time domain resource carrying an RS, power that is greater than required power of the channel. Because RS transmission power is increased while channel power is increased, accuracy of receiving a channel on a time domain resource carrying an RS can be improved.

If the first time domain resource carries the RS of the first uplink channel and the third time domain resource carries the RS of the third uplink channel, or if the first time domain resource does not carry the RS of the first uplink channel and the third time domain resource does not carry the RS of the third uplink channel, when a sum of the required power of the first uplink channel and the required power of the third uplink channel exceeds first total transmission power, power of the two uplink channels may be scaled down at a same ratio, so that a sum of transmission power of the two uplink channels does not exceed the first total transmission power. Proportionally scaling down power at a same ratio is: A*required power of the first uplink channel+A*required power of the third uplink channel+ . . . +power of an $i^{th}$ uplink channel=first total transmission power, where A may be a value less than 1. When the sum of the required power of the first uplink channel and the required power of the third uplink channel is less than the first total transmission power, and when the terminal determines the power of the first uplink channel and the power of the third uplink channel, the terminal may allocate additional and equivalent power to the first uplink channel and the third uplink channel, or may proportionally scale up the power of the first uplink channel and the power of the third uplink channel at a same ratio, so that the sum of the transmission power of the first uplink channel and the third uplink channel is greater than the first total transmission power. For example, additional equivalent power C={first total transmission power−required power of the first uplink channel−required power of the third uplink channel−required power of a fourth uplink channel− . . . −power of an $i^{th}$ uplink channel}/(i−1), or proportionally scaling up power at a same ratio is: B*required power of the first uplink channel+B*required power of the third uplink channel+ . . . +power of an $i^{th}$ uplink channel=first total transmission power, where B may be a value greater than 1. Certainly, priorities of channels may continue to be determined based on other factors. In addition, assuming that a priority of a channel with an RS may be higher than a priority of a channel without an RS, power of the channel with an RS may be preferentially ensured.

In a second manner, the terminal may determine the priority of the first uplink channel and the priority of the third uplink channel based on a receiving time of scheduling information corresponding to the first uplink channel and a receiving time of scheduling information corresponding to the third uplink channel. For example, the time for receiving the scheduling information corresponding to the first uplink channel by the terminal is earlier than the time for receiving the scheduling information corresponding to the third uplink channel by the terminal. It can be understood that a receiving time of scheduling information herein may be an absolute time for receiving the scheduling information, for example, a cth symbol in a subframe a; or may be a time domain resource that is corresponding to the first duration and on which the scheduling information is received. For example, the time for receiving the scheduling information corresponding to the first uplink channel by the terminal is earlier than the time for receiving the scheduling information corresponding to the third uplink channel by the terminal. In other words, a time domain resource on which the terminal receives the scheduling information corresponding to the first uplink channel is a time domain resource before a time domain resource on which the scheduling information corresponding to the third uplink channel is located. It indicates that a base station delivers the scheduling information corresponding to the third uplink channel later. In this case, a previous scheduling status of the first uplink channel has been considered. Therefore, scheduling of the third uplink channel may have a higher priority. For example, the time for receiving the scheduling information corresponding to the first uplink channel by the terminal is the same as the time for receiving the scheduling information corresponding to the third uplink channel by the terminal. In other words, the terminal receives, on a same time domain resource or on time domain resources having a same number, the scheduling information corresponding to the first uplink channel and the scheduling information corresponding to the third uplink channel. In this case, the priority of the first uplink channel is the same as the priority of the third uplink channel. The scheduling information is used to trigger the terminal to send information, and the scheduling information may be carried in downlink control information (DCI), or may be carried in a downlink physical control channel, or may be carried in higher layer signaling.

It can be learned that, when the receiving time of the scheduling information of the first uplink channel is earlier than the receiving time of the scheduling information of the third uplink channel, the priority of the third uplink channel is higher than the priority of the first uplink channel; when the receiving time of the scheduling information of the first uplink channel is later than the receiving time of the scheduling information of the third uplink channel, the priority of the first uplink channel is higher than the priority of the third uplink channel; and when the receiving time of the scheduling information of the first uplink channel is equal to the receiving time of the scheduling information of the third uplink channel, the priority of the first uplink channel may be equal to the priority of the third uplink channel, or the priorities may be determined in another manner.

A method for allocating channel power based on a priority is the same as the first manner, and details are not described herein again.

In a third manner, the terminal may determine the priority of the first uplink channel and the priority of the third uplink channel based on a receiving time of downlink transmission corresponding to the first uplink channel and a receiving time of downlink transmission corresponding to the third uplink channel. Downlink transmission corresponding to an uplink channel is transmission of downlink data, and an acknowledgement (ACK) or a negative acknowledgement (NACK) of a hybrid automatic repeat request (HARQ) corresponding to the downlink data needs to be fed back on the uplink channel. For example, a base station transmits downlink data, and the terminal needs to feed back a receiving status of the downlink data on the first uplink channel. In this case, downlink transmission corresponding to the first uplink channel is transmission of the downlink data. The base station delivers downlink data earlier indicates that a feedback needs to be obtained more urgently. Therefore, an uplink channel used to feed back a receiving status of the downlink data has a higher priority. A downlink data receiving time may be an absolute time for receiving a downlink data channel, or may be a time domain resource that is corresponding to duration and on which a downlink data channel is received.

It can be learned that, when the receiving time of the downlink transmission corresponding to the first uplink channel is earlier than the receiving time of the downlink transmission corresponding to the third uplink channel, the priority of the first uplink channel is higher than the priority of the third uplink channel; when the receiving time of the downlink transmission corresponding to the first uplink channel is later than the receiving time of the downlink transmission corresponding to the third uplink channel, the priority of the third uplink channel is higher than the priority of the first uplink channel; and when the receiving time of the downlink transmission corresponding to the first uplink channel is equal to the receiving time of the downlink transmission corresponding to the third uplink channel, the priority of the first uplink channel may be equal to the priority of the third uplink channel, or the priorities may be determined in another manner.

A method for allocating channel power based on a priority is the same as the first manner, and details are not described herein again.

In a fourth manner, the terminal may determine the priority of the first uplink channel and the priority of the third uplink channel based on first indication information. The first indication information may be information that indicates the priority of the first uplink channel and the priority of the third uplink channel and that is sent by a base station by using Radio Resource Control (RRC) signaling or downlink control information (DCI). The indication information may be the priority of the first uplink channel and the priority of the third uplink channel, or may be an indicated priority principle used to indicate a priority sequence.

In a fifth manner, the terminal may determine the priority of the first uplink channel and the priority of the third uplink channel based on a process time of the first uplink channel and a process time of the third uplink channel. A shorter process time indicates a higher priority. A process time may be determined through RRC signaling configuration or by using transmission delay indication information carried in DCI. For example, if the process time of the first uplink channel is (n+4) time domain resources corresponding to the first duration, and the process time of the third uplink channel is (n+3) time domain resources corresponding to the first duration, the priority of the third uplink channel is higher than the priority of the first uplink channel. When the first uplink channel and the third uplink channel have a same process time, the priority of the first uplink channel may be equal to the priority of the third uplink channel, or the priorities may be determined in another manner.

In a sixth manner, the terminal may determine a channel priority based on a channel type. For example, a priority of a control channel is higher than a priority of a data channel. When the third uplink channel is an uplink control channel, the uplink control channel is used to carry uplink control information (UCI). When the first uplink channel is an uplink data channel, the uplink data channel is used to carry service data. The priority of the third uplink channel is higher than the priority of the first uplink channel, and vice versa. When the first uplink channel and the third uplink channel are channels of a same channel type, the priority of the first uplink channel may be equal to the priority of the third uplink channel, or the priorities may be determined in another manner.

In a seventh manner, the terminal may determine a channel priority based on a UCI type. For example, priority sequence of UCI types may be: hybrid automatic repeat request (HARQ) feedback or scheduling request (SR)>channel state information (CSI). This manner may be combined with the foregoing manner: a control information sending priority is higher than a service data sending priority. In addition, for same UCI, the following priority sequence may be obtained: HARQ/SR>CSI>service data>sounding reference signal (SRS).

In an eighth manner, the terminal may determine a priority based on duration of a time domain resource on which a channel is located, and a channel on a time domain resource corresponding to shorter duration has a higher priority. For example, when a time domain resource on which the third uplink channel is located is a time domain resource corresponding to duration of 1 ms, and a time domain resource on which the first uplink channel is located is a time domain resource corresponding to duration that is less than or equal to 0.5 ms, the priority of the first uplink channel is higher than the priority of the third uplink channel. When the first uplink channel and the third uplink channel are located on time domain resources corresponding to same duration, the priority of the first uplink channel may be equal to the priority of the third uplink channel, or the priorities may be determined in another manner.

In a ninth manner, a priority of a channel on which Radio Resource Control (RRC) signaling can be carried is higher than a priority of a channel on which no RRC signaling is carried. For example, a channel priority of a master cell group (MCG) is higher than a channel priority of a secondary cell group (SCG). For example, when the third uplink channel is a channel in the secondary cell group, and the first uplink channel is a channel in the master cell group, the priority of the first uplink channel is higher than the priority of the third uplink channel. When the first uplink channel and the third uplink channel are channels in a same cell group, the priority of the first uplink channel may be equal to the priority of the third uplink channel, or the priorities may be determined in another manner.

The foregoing manners are merely examples and are not intended to limit the present invention, and some or all the manners may be combined for use. In addition, a priority sequence of the manners may be specified, and channel priority determining is successively performed in selected manners in the specified sequence. When determining is performed in all the selected manners, channel power may be scaled down at a same ratio when channel priorities are the same.

For example, a priority sequence obtained by combination of the foregoing several manners is: short-TTI physical uplink control channel (sPUCCH)>short-TTI physical uplink data channel without a DMRS and with UCI (for example, a physical uplink shared channel, sPUSCH, without a DMRS and with UCI)>short-TTI physical uplink data channel without a DMRS and without UCI (for example, a physical uplink shared channel, sPUSCH, without a DMRS and without UCI)>conventional-TTI physical uplink control channel (PUCCH)>conventional-TTI physical uplink data channel with UCI (for example, a physical uplink shared channel, PUSCH, with UCI)>conventional-TTI physical uplink data channel without UCI (for example, physical uplink shared channel, PUSCH, without UCI)>short-TTI physical uplink shared channel with a DMRS and without UCI (for example, a physical uplink shared channel, sPUSCH, with a DMRS and without UCI)>SRS.

In step S702, in a process in which the terminal preferentially allocates power to an uplink channel of a higher priority, the terminal may allocate power to an uplink channel of a lower priority, or may not allocate power to an uplink channel of a lower priority due to power limitation. For example, when the first uplink channel carries no RS, power may continue to be allocated to the uplink channel of a lower priority when the first total transmission power permits. For example, when the priority of the third uplink channel is higher than the priority of the first uplink channel, power is allocated to the third uplink channel. When there is remaining power sufficient for allocating to the first uplink channel after the power allocated to the third uplink channel is subtracted from the first total transmission power, power is allocated to the first uplink channel; otherwise, sending of the first uplink channel is canceled, and vice versa. When the first uplink channel carries the RS and the third channel carries the RS, power may continue to be allocated to the uplink channel of a lower priority when maximum transmission power allowed by the terminal permits. For example, when the priority of the third uplink channel is higher than the priority of the first uplink channel, power is allocated to the third uplink channel. When there is remaining power sufficient for allocating to the first uplink channel after the power allocated to the third uplink channel is subtracted from the maximum transmission power allowed by the terminal, power is allocated to the first uplink channel; otherwise, sending of the first uplink channel is canceled.

Figure 8:
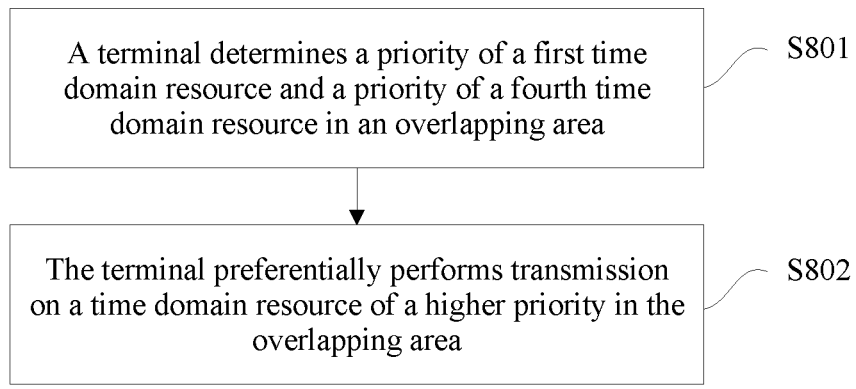
FIG. 8 is a flowchart of another uplink channel sending method according to an embodiment of the present invention.

FIG. 8 is a schematic diagram of another uplink channel sending method according to an embodiment of the present invention. In this embodiment, an overlapping area exists between a first time domain resource and another time domain resource in terms of time. For ease of description, the another time domain resource is referred to as a fourth time domain resource below. A terminal determines a priority of the first time domain resource and a priority of the fourth time domain resource in the overlapping area, and preferentially performs transmission on a time domain resource of a higher priority. In this case, the method includes the following steps:

S801. The terminal determines the priority of the first time domain resource and the priority of the fourth time domain resource in the overlapping area.

S802. The terminal preferentially performs transmission on a time domain resource of a higher priority in the overlapping area.

The foregoing overlapping may be caused by timing advance (TA) adjustment. In this case, a carrier on which the first time domain resource is located and a carrier on which the fourth time domain resource is located may belong to a same TA group (TAG), or the first time domain resource and the fourth time domain resource may be on a same carrier.

Optionally, when the overlapping area between the fourth time domain resource and the first time domain resource does not exceed one symbol, after the terminal determines the priority of the first time domain resource and the priority of the fourth time domain resource in the overlapping area, the terminal determines transmission in the overlapping area based on a priority. When the overlapping area exceeds one symbol, it indicates that the overlapping area between the two time domain resources is relatively large. It should be determined, based on a priority of a first uplink channel on the first time domain resource and a priority of a fourth uplink channel on the fourth time domain resource, power allocated to a channel or a channel to be preferentially transmitted. It should be noted that one symbol is used as an example herein, and in specific application, a time period less than one symbol or greater than one symbol may be used.

Optionally, a time domain resource number of the fourth time domain resource is different from a number of the first time domain resource.

Optionally, when duration of the two time domain resources is the same, overlapping area=duration of a time domain resource—transmission time difference between two time domain resources.

The symbol in the present invention is an orthogonal frequency division multiplexing (OFDM) symbol or a single carrier frequency division multiple access (SC-FDMA) symbol.

In step S801, the terminal may determine the priority of the first time domain resource and the priority of the fourth time domain resource in the overlapping area based on information about an RS on the first time domain resource and information about an RS on the fourth time domain resource.

Figure 9A:
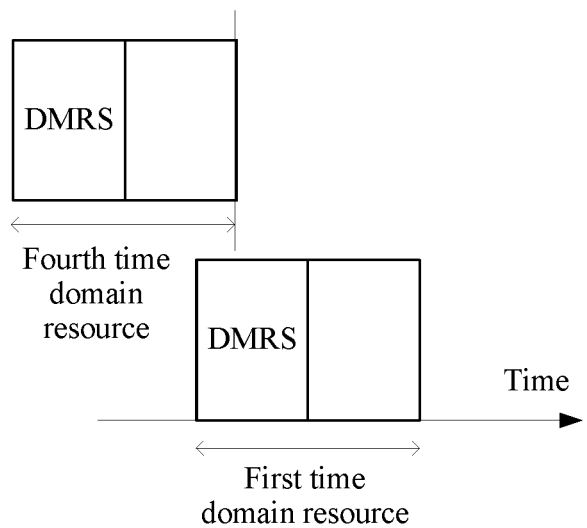
FIG. 9A is a schematic diagram in which time domain resources overlap in terms of time according to an embodiment of the present invention.
Figure 9B:
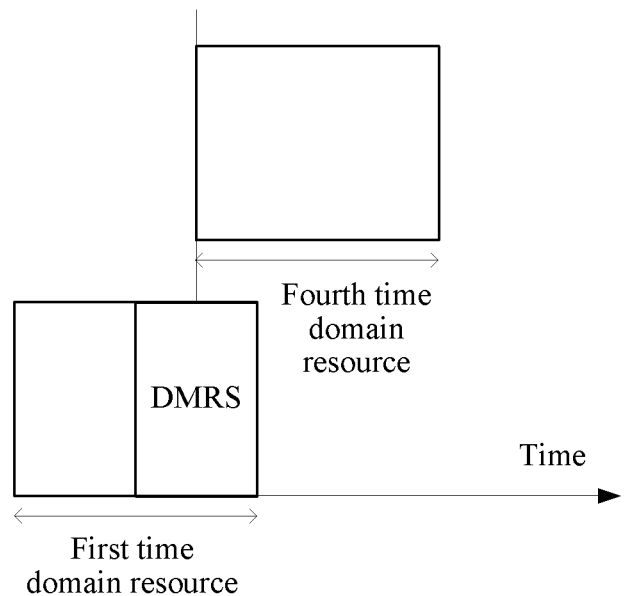
FIG. 9B is another schematic diagram in which time domain resources overlap in terms of time according to an embodiment of the present invention.

For example, referring to FIG. 9A or FIG. 9B, an overlapping area exists between a first time domain resource and a fourth time domain resource in terms of time. As shown in FIG. 9A or FIG. 9B, when the overlapping area carries an RS on the first time domain resource and does not carry an RS on the fourth time domain resource, a priority of the first time domain resource is higher than a priority of the fourth time domain resource. When the overlapping area carries an RS on the fourth time domain resource and does not carry an RS on the first time domain resource, a priority of the fourth time domain resource is higher than a priority of the first time domain resource.

When the overlapping area carries both an RS on the first time domain resource and an RS on a fourth time domain resource, or when the overlapping area carries neither of RSs on the two time domain resources, the terminal may further determine priorities of the first time domain resource and the fourth time domain resource based on duration of the first time domain resource and duration of the fourth time domain resource. For example, a time domain resource corresponding to longer duration has a higher priority. Certainly, a priority may be further determined based on another policy.

When the overlapping area carries a reference signal on the first time domain resource and a reference signal on the fourth time domain resource, or when the overlapping area does not carry a reference signal on the first time domain resource or a reference signal on the fourth time domain resource, a time domain resource corresponding to longer duration has a higher priority; or when the overlapping area carries a reference signal on the first time domain resource and a reference signal on the fourth time domain resource, or when the overlapping area does not carry a reference signal on the first time domain resource or a reference signal on the fourth time domain resource, a time domain resource corresponding to an earlier start moment has a higher priority.

It should be noted that, if the terminal has a capability of simultaneously performing on a plurality of time domain resources, and/or a base station configures that: the terminal simultaneously performs transmission on a plurality of time domain resources and information on the plurality of time domain resources does not overlap in frequency domain, the terminal can transmit both a time domain resource of a higher priority and a time domain resource of a lower priority. However, if the terminal has no capability of simultaneously performing transmission on a plurality of time domain resources, or a base station does not configure that: the terminal simultaneously performs transmission on a plurality of time domain resources or information on the plurality of time domain resources overlaps in frequency domain, on at least time domain resources that overlap in frequency domain, the terminal can perform transmission on only a time domain resource of a higher priority, and cancel transmission on a time domain resource of a lower priority in the overlapping area.

In another implementation, for time domain resources corresponding to different duration that overlap with each other, the terminal may determine the priority of the first time domain resource and the priority of the fourth time domain resource in the overlapping area based on the duration of the first time domain resource, the duration of the fourth time domain resource, and information about an RS carried in the overlapping area.

For example, when the duration of the first time domain resource is greater than the duration of the fourth time domain resource, and the overlapping area carries the RS on the first time domain resource, the priority of the first time domain resource is higher than the priority of the fourth time domain resource. In this case, whether the overlapping area carries the RS on the fourth time domain resource may not be considered. When the duration of the fourth time domain resource is greater than the duration of the first time domain resource, and the overlapping area carries the RS on the fourth time domain resource, the priority of the fourth time domain resource is higher than the priority of the first time domain resource. In this case, whether the overlapping area carries the RS on the first time domain resource may not be considered.

In an embodiment, guaranteed power of a PA may be set, so that the PA can use transmission power same as previous transmission power during multicarrier and multichannel transmission. In this way, it can be ensured that the foregoing first total transmission power does not change. In other words, sums of transmission power of at least one uplink channel corresponding to the PA on a plurality of time domain resources may be equal, so that the base station can correctly demodulate the uplink channels by using a same RS of the uplink channels on the plurality of time domain resources.

Optionally, the terminal receives second indication information. The second indication information is used to indicate guaranteed power of at least one PA, and the second indication information may be carried in DCI information or higher layer signaling.

The guaranteed power of the PA may be set by the base station and sent to the terminal, or may be minimum guaranteed power that is preset by the terminal. Specific guaranteed power may be a specific power value, or may be a product of maximum transmission power allowed by the terminal and a ratio value.

In this case, before the terminal determines the first transmission power of the first uplink channel, the method shown in FIG. 3 further includes: obtaining, by the terminal, guaranteed power of a PA corresponding to the first uplink channel. A sum of power of at least one uplink channel corresponding to the PA is less than or equal to the guaranteed power. In this case, the terminal may determine the first transmission power based on the guaranteed power. The first transmission power is less than or equal to the guaranteed power, and the sum of the power of the at least one uplink channel corresponding to the PA is less than or equal to the guaranteed power.

When the base station configures the guaranteed power for the terminal, the terminal may report a correspondence between the PA on the terminal and an uplink channel or a correspondence between the PA and an uplink carrier/uplink carrier group before receiving the guaranteed power. Certainly, both of the two correspondences may be reported.

In the foregoing embodiment, the terminal may voluntarily determine whether to send the RS of the first uplink channel on the first time domain resource, or may determine, according to an instruction of the base station, whether to send the RS of the first uplink channel on the first time domain resource, so as to avoid a problem that an uplink channel cannot be correctly received because power of an RS and power of the uplink channel are different. For example, when the terminal receives instruction information sent by the base station, the instruction information is used to instruct the terminal to send the RS of the first uplink channel on the first time domain resource.

The terminal may voluntarily determine to send the RS of the first uplink channel on the first time domain resource in the following cases:

a maximum transmission power allowed by the terminal on the first time domain resource is less than a maximum transmission power allowed by the terminal on a second time domain resource;

a quantity of uplink channels on the first time domain resource changes;

a sum of transmission power of uplink channels on the first time domain resource is greater than the maximum transmission power allowed by the terminal on the first time domain resource;

the terminal performs transmission on W contiguous time domain resources, and the W contiguous time domain resources do not carry a reference signal, where W is a preset integer greater than 1;

a preset time interval in which no transmission is performed exists between the first time domain resource and the second time domain resource; and a quantity of uplink carriers of the terminal that overlap in time domain changes.

In the foregoing embodiment, the terminal reports whether the terminal has a capability of sending a same RS on a plurality of time domain resources. Therefore, the base station may indicate, based on the capability of the terminal, whether RSs of uplink channels sent by the terminal on a plurality of time domain resources are a same RS, so as to avoid a problem that uplink channels with a same RS cannot be correctly received because a phase hop easily occurs in the PA of the terminal. Optionally, the terminal receives indication information indicating that RSs of a plurality of time domain resources configured by the base station are a same RS.

In the foregoing embodiment, the terminal reports a channel sending status of at least one base station. For example, non-ideal backhaul interaction exists between base stations. In other words, communication cannot be performed in real time. Therefore, when the terminal simultaneously communicates with at least two base stations, the terminal needs to report a sending status of an uplink channel of another base station in the at least two base stations, so as to avoid a problem: When RSs on a plurality of time domain resources scheduled by a base station are a same RS, phases are different because transmission power of an RS and transmission power of an uplink channel are different caused by insufficient power, and consequently an uplink channel cannot be correctly received.

In the foregoing embodiment, the terminal uses only an uplink data channel to carry UCI, or cannot transmit both an uplink control channel and an uplink data channel on one carrier, so as to avoid a problem: When RSs on a plurality of time domain resources are a same RS, phases are different because transmission power of an RS and transmission power of an uplink channel are different caused by insufficient power of a plurality of channels on one carrier, and consequently an uplink channel cannot be correctly received.

Figure 10A:
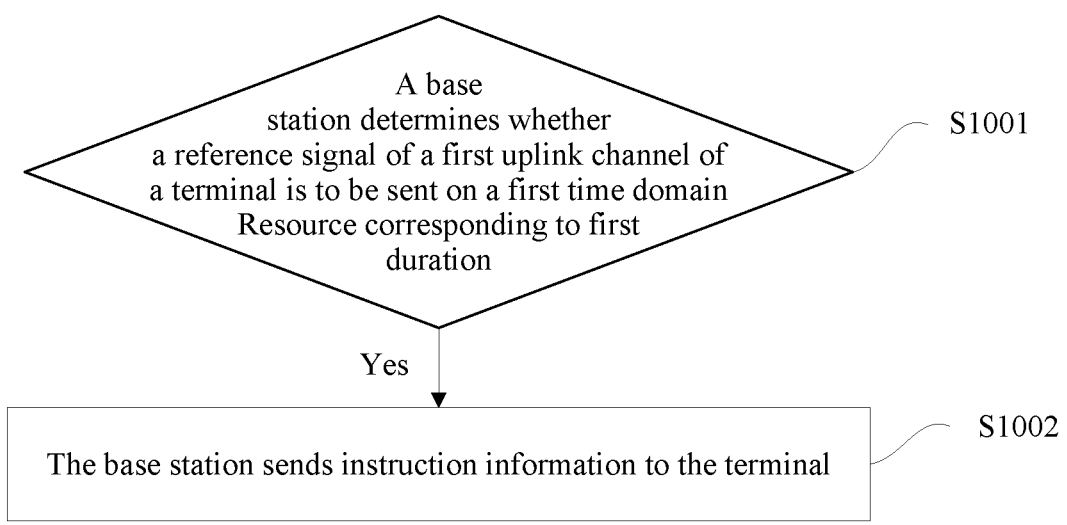
FIG. 10A is a flowchart of another uplink channel sending method according to an embodiment of the present invention.

An embodiment of the present invention further provides an uplink data transmission method, and the method is executed by a base station. Referring to FIG. 10A, the method includes the following steps.

S1001. The base station determines whether a reference signal of a first uplink channel of a terminal is to be sent on a first time domain resource corresponding to first duration, where the reference signal is used to demodulate the first uplink channel.

S1002. When determining that the reference signal is to be sent, the base station sends instruction information to the terminal. The instruction information is used to instruct the terminal to send the reference signal of the first uplink channel on the first time domain resource.

Figure 10B:
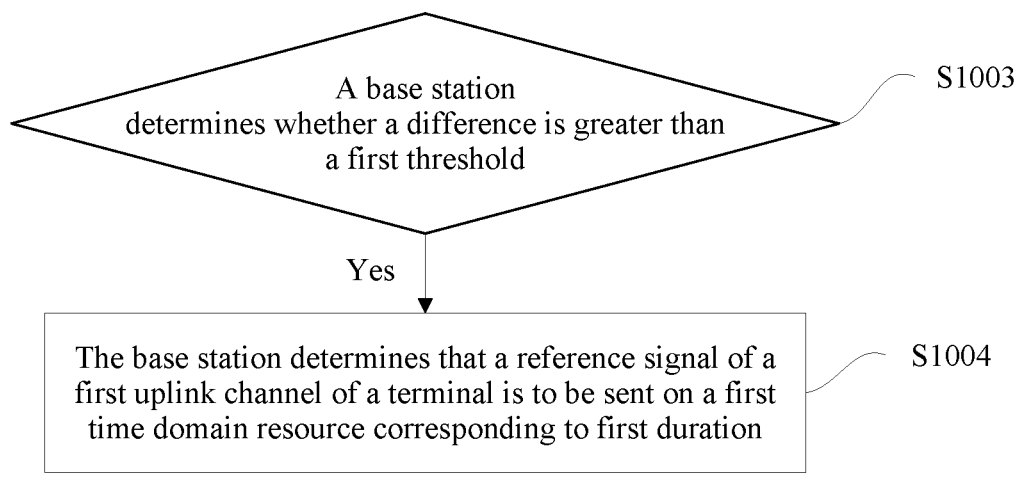
FIG. 10B is a flowchart of another uplink channel sending method according to an embodiment of the present invention.

Optionally, as shown in FIG. 10B, the base station determines, in the following manner, whether the reference signal of the first uplink channel of the terminal needs to be sent on the first time domain resource corresponding to the first duration.

S1003. The base station determines whether a difference is greater than a first threshold. The difference is a difference between a quantity of uplink carriers sent by the terminal on the first time domain resource and a quantity of uplink carriers sent by the terminal on a second time domain resource, or the difference is a difference between a quantity of uplink channels sent by the terminal on the first time domain resource and a quantity of uplink channels sent by the terminal on a second time domain resource.

S1004. When the difference is greater than the first threshold, the base station determines that the reference signal of the first uplink channel of the terminal is to be sent on the first time domain resource corresponding to the first duration.

Figure 11:
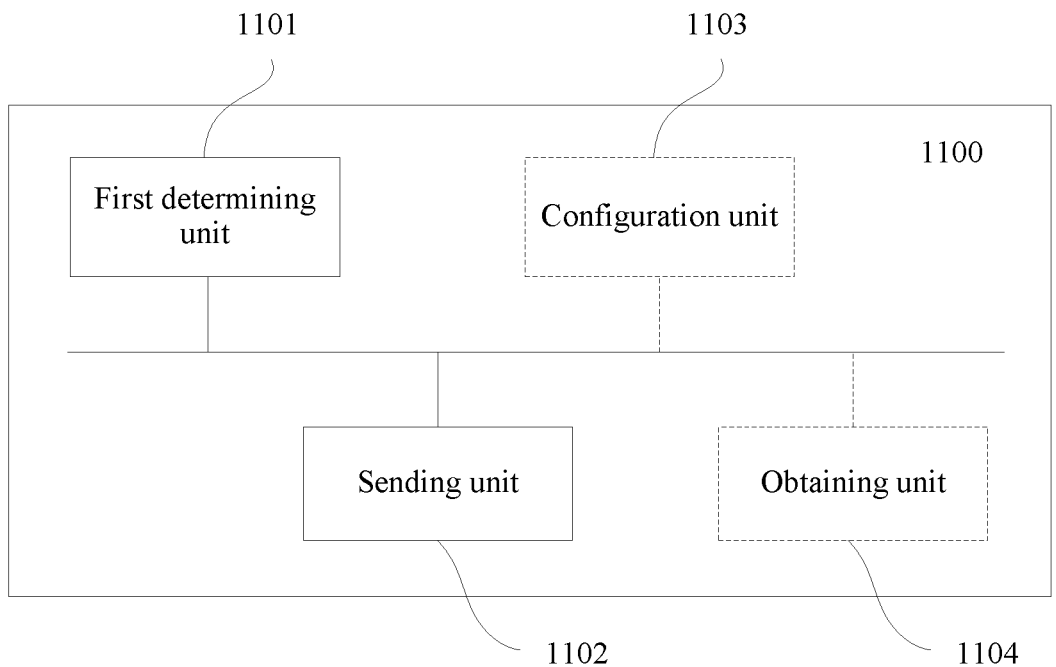
FIG. 11 is a schematic structural diagram of an uplink channel sending apparatus 1100 according to an embodiment of the present invention.

FIG. 11 is a schematic structural diagram of an uplink channel sending apparatus 1100 according to an embodiment of the present invention. The apparatus is located in a terminal, and may be configured to implement an operation of the terminal in the foregoing method embodiments. The apparatus 1100 includes a first determining unit 1101 and a sending unit 1102.

The first determining unit 1101 is configured to determine first transmission power of a first uplink channel, where the first uplink channel is one of at least one uplink channel on a first time domain resource corresponding to first duration. The sending unit 1102 is configured to send the first uplink channel at the first transmission power determined by the first determining unit 1101.

A manner of determining the first transmission power by the first determining unit 1101 is the same as that of the foregoing method embodiments, and details are not described herein again.

In addition, descriptions of time domain resource duration, a case in which the first time domain resource does not carry a reference signal of the first uplink channel, a case in which the first time domain resource carries a reference signal of the first uplink channel, at least one uplink channel on the first time domain resource, at least one uplink channel on a second time domain resource, and the like are the same as those of the foregoing embodiments.

Further referring to FIG. 11, optionally, the apparatus 1100 may further include a configuration unit 1103, configured to: before the first determining unit 1101 determines the first transmission power, configure maximum transmission power allowed by the terminal on the first time domain resource to be equal to maximum transmission power allowed by the terminal on the second time domain resource.

Optionally, the apparatus 1100 may further include an obtaining unit 1104, configured to: before the first determining unit 1101 determines the first transmission power, obtain guaranteed power of a power amplifier corresponding to the first uplink channel, where a sum of power of at least one uplink channel corresponding to the power amplifier is less than or equal to the guaranteed power. A manner of obtaining the guaranteed power is the same as that of the foregoing embodiments, and details are not described herein again. In addition, when the guaranteed power is obtained from a base station, the sending unit 1102 may be further configured to report a correspondence between the power amplifier and an uplink channel and/or a correspondence between the power amplifier and an uplink carrier/uplink carrier group.

Optionally, when transmission of the first uplink channel overlaps with transmission of a third uplink channel in terms of time, the first determining unit 1101 is configured to: determine a priority of the first uplink channel and a priority of the third uplink channel; and preferentially allocate power to an uplink channel of a higher priority.

A method for determining the priority of the first uplink channel and the priority of the third uplink channel is the same as that of the foregoing embodiments, and details are not described herein again. Optionally, when an overlapping area exists between the first time domain resource and a fourth time domain resource in terms of time, compared with the apparatus shown in FIG. 11, an apparatus 1200 shown in FIG. 12 further includes:

a second determining unit 1201, configured to determine a priority of the first time domain resource and a priority of the fourth time domain resource in the overlapping area; and a transmission unit 1202, configured to preferentially perform transmission on a time domain resource of a higher priority in the overlapping area.

A method for determining the priority of the first time domain resource and the priority of the fourth time domain resource in the overlapping area by the second determining unit 1201 is the same as that of the foregoing embodiments, and details are not described herein again.

By using descriptions of the foregoing uplink channel sending apparatus, it should be understood that division of the units in the foregoing apparatus is merely logical function division. In actual implementation, all or some of the units may be integrated into one physical entity, or may be physically separated. In addition, these units may all be implemented in a form of software invoked by using a processing element, or may all be implemented in a form of hardware; or some units may be implemented in a form of software invoked by using a processing element, and some units may be implemented in a form of hardware. For example, the first determining unit 1101 may be a separately disposed processing element, or may be integrated into a chip of the terminal for implementation, or may be stored in a memory of the terminal in a form of program code and invoked by a processing element of the terminal to implement functions of the foregoing units. Implementation of other units is similar to this. In addition, all or some of these units may be integrated together or may be separately implemented. The processing element herein may be an integrated circuit and have a signal processing capability. In an implementation process, steps of the foregoing methods or the foregoing units may be completed by using an integrated logic circuit of hardware in the processor element or an instruction in a form of software.

For example, the foregoing units may be configured as one or more integrated circuits that perform the foregoing methods, for example, one or more application-specific integrated circuits (ASIC), one or more microprocessors (DSP), or one or more field programmable gate arrays (FPGA). For another example, when one of the foregoing units is implemented in a form of invoking program code by a processing element, the processing element may be a general purpose processor, for example, a central processing unit (CPU), or another processor that can invoke the program code. For another example, these units may be integrated together and implemented in a form of a system-on-a-chip (SOC).

Figure 13:
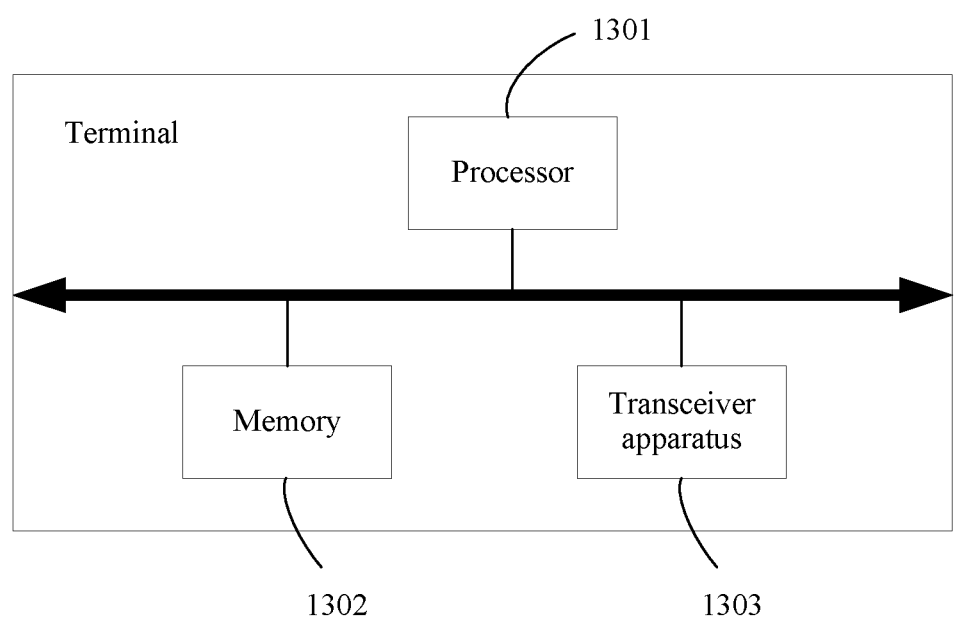
FIG. 13 a schematic structural diagram of a terminal according to an embodiment of the present invention.

The foregoing units are specifically implemented in a terminal. FIG. 13 is a schematic structural diagram of a terminal according to an embodiment of the present invention. As shown in FIG. 13, the terminal includes a processor 1301, a memory 1302, and a transceiver apparatus 1303. The transceiver apparatus 1303 may be connected to an antenna. In a downlink direction, the transceiver apparatus 1303 receives, by using the antenna, information sent by a base station, and sends the information to the processor 1301 for processing. In an uplink direction, the processor 1301 processes data of the terminal, and sends the data to the base station by using the transceiver apparatus 1303.

Figure 12:
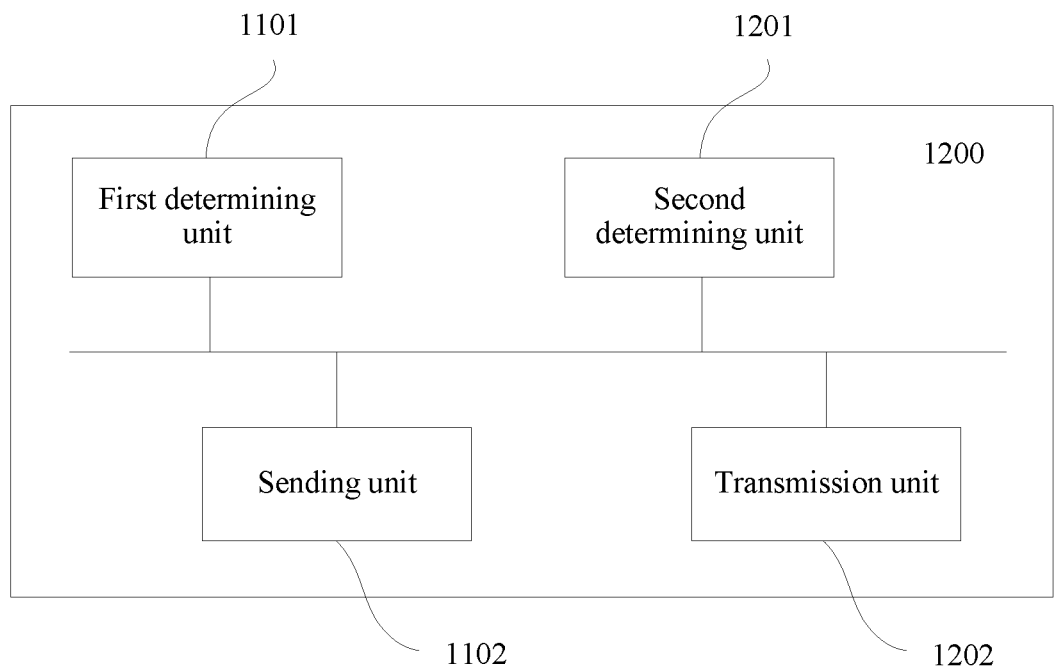
FIG. 12 is a schematic structural diagram of another uplink channel sending apparatus 1200 according to an embodiment of the present invention.

The memory 1302 is configured to store program code used to implement the foregoing method embodiments or each unit in the foregoing apparatus embodiment, and the processor 1301 invokes the program code to perform operations in the foregoing method embodiments, so as to implement units shown in FIG. 11 and FIG. 12.

Alternatively, some or all of the foregoing units may be implemented by using an integrated circuit that is embedded in a chip of the terminal. In addition, the units may be independently implemented, or may be integrated together. In other words, the foregoing units may be configured as one or more integrated circuits that perform the foregoing methods, for example, one or more application-specific integrated circuits (ASIC), one or more microprocessors (DSP), or one or more field programmable gate arrays (FPGA).

Figure 14:
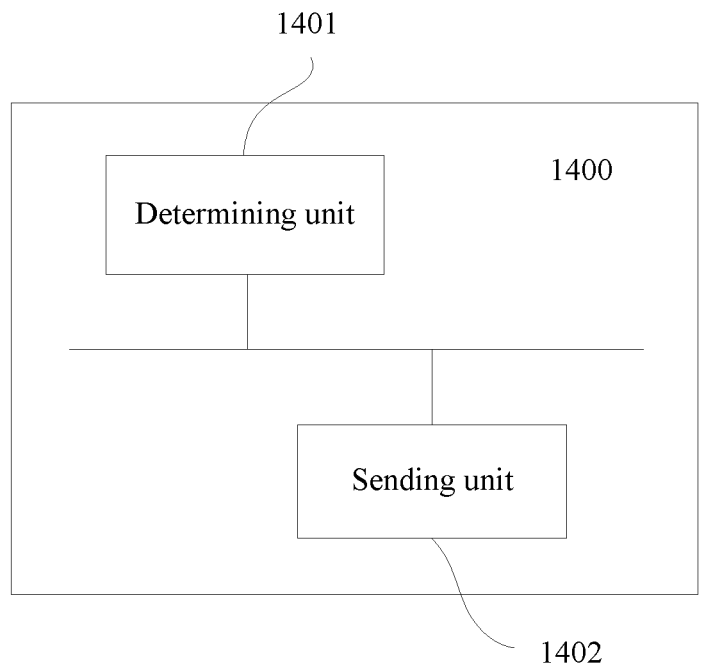
FIG. 14 is a schematic structural diagram of another uplink channel sending apparatus 1400 according to an embodiment of the present invention.

FIG. 14 is a schematic structural diagram of an uplink channel sending apparatus 1400 according to an embodiment of the present invention. The apparatus is located in a base station, and may be configured to implement an operation of the base station in the foregoing method embodiment shown in FIG. 10A or FIG. 10B. The apparatus 1400 includes a determining unit 1401 and a sending unit 1402.

The determining unit 1401 is configured to determine whether a reference signal of a first uplink channel of a terminal is to be sent on a first time domain resource corresponding to first duration.

The sending unit 1402 is configured to: when the determining unit 1401 determines that the reference signal of the first uplink channel of the terminal is to be sent on the first time domain resource corresponding to the first duration, send instruction information to the terminal.

Optionally, the base station determines, by using the determining unit 1401, whether the reference signal of the first uplink channel of the terminal needs to be sent on the first time domain resource corresponding to the first duration.

The determining unit 1401 determines whether a difference is greater than a first threshold, where the difference is a difference between a quantity of uplink carriers sent by the terminal on the first time domain resource and a quantity of uplink carriers sent by the terminal on a second time domain resource, or the difference is a difference between a quantity of uplink channels sent by the terminal on the first time domain resource and a quantity of uplink channels sent by the terminal on a second time domain resource.

When the difference is greater than the first threshold, the base station determines that the reference signal of the first uplink channel of the terminal is to be sent on the first time domain resource corresponding to the first duration.

By using descriptions of the foregoing uplink channel sending apparatus, it should be understood that division of the units in the foregoing apparatus is merely logical function division. In actual implementation, all or some of the units may be integrated into one physical entity, or may be physically separated. In addition, these units may all be implemented in a form of software invoked by using a processing element, or may all be implemented in a form of hardware; or some units may be implemented in a form of software invoked by using a processing element, and some units may be implemented in a form of hardware. For example, the determining unit 1401 may be a separately disposed processing element, or may be integrated into a chip of the base station for implementation, or may be stored in a memory of the base station in a form of program code and invoked by a processing element of the base station to implement functions of the foregoing units. Implementation of other units is similar to this. In addition, all or some of these units may be integrated together or may be separately implemented. The processing element herein may be an integrated circuit and have a signal processing capability. In an implementation process, steps of the foregoing methods or the foregoing units may be completed by using an integrated logic circuit of hardware in the processor element or an instruction in a form of software.

For example, the foregoing units may be configured as one or more integrated circuits that perform the foregoing methods, for example, one or more application-specific integrated circuits (ASIC), one or more microprocessors (DSP), or one or more field programmable gate arrays (FPGA). For another example, when one of the foregoing units is implemented in a form of invoking program code by a processing element, the processing element may be a general purpose processor, for example, a central processing unit (CPU), or another processor that can invoke the program code. For another example, these units may be integrated together and implemented in a form of a system-on-a-chip (SOC).

Figure 15:
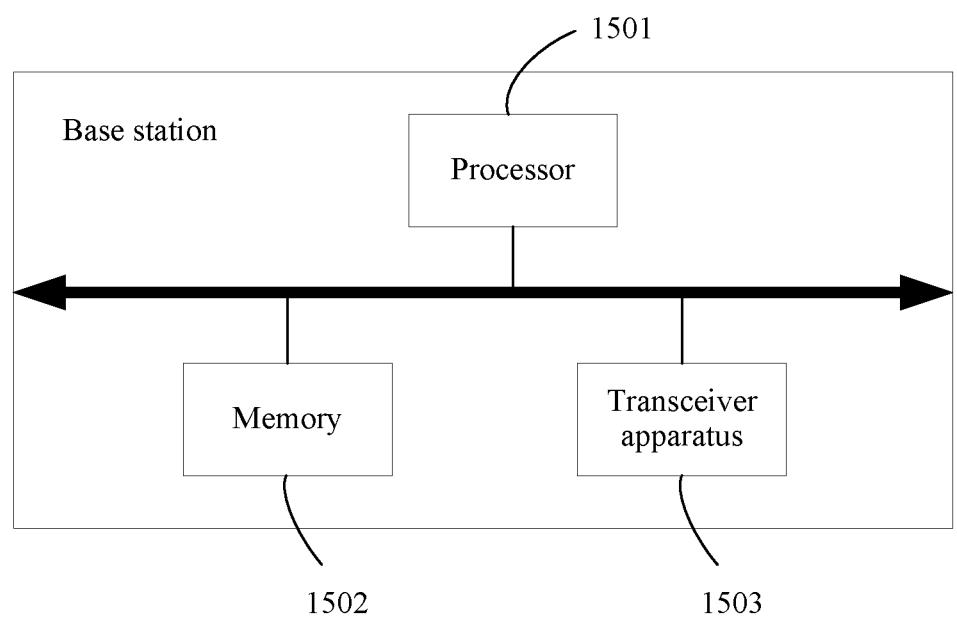
FIG. 15 is a schematic structural diagram of a base station according to an embodiment of the present invention.

The foregoing units are specifically implemented in a base station. FIG. 15 is a schematic structural diagram of a base station according to an embodiment of the present invention. As shown in FIG. 15, the base station includes a processor 1501, a memory 1502, and a transceiver apparatus 1503. The transceiver apparatus 1503 may be connected to an antenna. In an uplink direction, the transceiver apparatus 1503 receives, by using the antenna, information sent by a terminal, and sends the information to the processor 1501 for processing. In a downlink direction, the processor 1501 processes data of the base station, and sends the data to the terminal by using the transceiver apparatus 1503.

The memory 1502 is configured to store program code used to implement the method embodiment in FIG. 10A or FIG. 10B or each unit in the apparatus embodiment in FIG. 14, and the processor 1501 invokes the program code to perform operations in the foregoing method embodiments, so as to implement units shown in FIG. 14.

Alternatively, some or all of the foregoing units may be implemented by using an integrated circuit that is embedded in a chip of the base station. In addition, the units may be independently implemented, or may be integrated together. In other words, the foregoing units may be configured as one or more integrated circuits that perform the foregoing methods, for example, one or more application-specific integrated circuits (ASIC), one or more microprocessors (DSP), or one or more field programmable gate arrays (FPGA).

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a random access memory (RAM), a read-only memory (ROM), an electrically erasable programmable read-only memory (EEPROM), a compact disc read-only memory (CD-ROM), or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong.

In summary, what is described above is merely example embodiments of technical solutions of the present invention, but is not intended to limit the protection scope of the present invention. Any modification, equivalent replacement, or improvement made without departing from the spirit and principle of the present invention may fall within the protection scope of the present invention.

Additionally, statements made herein characterizing the invention refer to an embodiment of the invention and not necessarily all embodiments.

What is claimed is:

1. A method, comprising:
   determining, by a terminal, that a resource of a first uplink channel carries a reference signal for demodulating the first uplink channel and that a resource of a second uplink channel does not carry a reference signal for demodulating the second uplink channel;
   based on the resource of the first uplink channel carrying a reference signal for demodulating the first uplink channel and based on the resource of the second uplink channel not carrying a reference signal for demodulating the second uplink channel, determining, by the terminal, that a priority of the first uplink channel is higher than a priority of the second uplink channel wherein the resource of the first uplink channel overlaps with the resource of the second uplink channel in terms of time; and
   based on determining that the priority of the first uplink channel is higher than the priority of the second uplink channel, preferentially allocating, by the terminal, transmission power to the first uplink channel.

2. The method according to claim 1, wherein preferentially allocating transmission power to the first uplink channel comprises:
   allocating, by the terminal, transmission power to the first uplink channel; and
   cancelling, by the terminal, sending of the second uplink channel.

3. The method according to claim 1, further comprising:
   determining, by the terminal, a transmission power of the first uplink channel, wherein the first uplink channel is on a first time domain resource corresponding to a first duration; and
   sending, by the terminal, the first uplink channel at the transmission power.

4. The method according to claim 3, wherein the first duration is less than or equal to 0.5 ms.

5. An apparatus, comprising:
   a non-transitory computer-readable memory having processor-executable instructions stored thereon; and
   at least one processor coupled to the non-transitory computer-readable memory, wherein the at least one processor is configured to execute the processor-executable instructions to:
      determine that a resource of a first uplink channel carries a reference signal for demodulating the first uplink channel and that a resource of a second uplink channel does not carry a reference signal for demodulating the second uplink channel;
      based on the resource of the first uplink channel carrying a reference signal for demodulating the first uplink channel and based on the resource of the second uplink channel not carrying a reference signal for demodulating the second uplink channel, determine that a priority of the first uplink channel is higher than a priority of the second uplink channel, wherein the resource of the first uplink channel overlaps with the resource of the second uplink channel in terms of time; and
      based on determining that the priority of the first uplink channel is higher than the priority of the second uplink channel, preferentially allocate transmission power to the first uplink channel.

6. The apparatus according to claim 5, wherein preferentially allocating transmission power to the first uplink channel comprises:
   allocating transmission power to the first uplink channel; and
   cancelling sending of the second uplink channel.

7. The apparatus according to claim 5, wherein the at least one processor is further configured to execute the processor-executable instructions to:
   determine a transmission power of the first uplink channel, wherein the first uplink channel is one of at least one uplink channel on a first time domain resource corresponding to a first duration; and
   send the first uplink channel at the transmission power.

8. The apparatus according to claim 7, wherein the first duration is less than or equal to 0.5 ms.

9. A non-transitory computer-readable storage medium having processor-executable instructions stored thereon, wherein the processor-executable instructions, when executed by a terminal, facilitate:
   determining that a resource of a first uplink channel carries a reference signal for demodulating the first uplink channel and that a resource of a second uplink channel does not carry a reference signal for demodulating the second uplink channel;
   based on the resource of the first uplink channel carrying a reference signal for demodulating the first uplink channel and based on the resource of the second uplink channel not carrying a reference signal for demodulating the second uplink channel, determining a priority of the first uplink channel is higher than a priority of the second uplink channel, wherein the resource of the first uplink channel overlaps with the resource of the second uplink channel in terms of time; and
   based on determining that the priority of the first uplink channel is higher than the priority of the second uplink channel, preferentially allocating transmission power to the first uplink channel.

10. The non-transitory computer-readable storage medium according to claim 9, wherein preferentially allocating transmission power to the first uplink channel comprises:
   allocating transmission power to the first uplink channel; and
   cancelling sending of the second uplink channel.

11. The non-transitory computer-readable storage medium according to claim 9, wherein the processor-executable instructions, when executed by the terminal, further facilitate:
   determining, by the terminal, a transmission power of the first uplink channel, wherein the first uplink channel is one of at least one uplink channel on a first time domain resource corresponding to a first duration; and
   sending the first uplink channel at the first transmission power.

12. The non-transitory computer-readable storage medium according to claim 11, wherein the first duration is less than or equal to 0.5 ms.

* * * * *